US012802954B2

(12) United States Patent
Viner et al.

(10) Patent No.: US 12,802,954 B2
(45) Date of Patent: Nov. 17, 2026

(54) MASS SPECTROMETER AND DATA ACQUISITION METHODS FOR IDENTIFICATION OF POSITIVE AND NEGATIVE ANALYTE IONS

(71) Applicants: THERMO FINNIGAN LLC, San Jose, CA (US); Thermo Fisher Scientific (Bremen) GmbH, Bremen (DE)

(72) Inventors: Rosa I. Viner, Fremont, CA (US); Hamish Stewart, Bremen (DE)

(73) Assignees: THERMO FINNIGAN LLC; Thermo Fisher Scientific (Bremen) GmbH, Bremen (DE)

( * ) Notice: Subject to any disclaimer, the term of this patent is extended or adjusted under 35 U.S.C. 154(b) by 348 days.

(21) Appl. No.: 18/419,454

(22) Filed: Jan. 22, 2024

(65) Prior Publication Data

US 2024/0274425 A1 Aug. 15, 2024

Related U.S. Application Data

(60) Provisional application No. 63/485,043, filed on Feb. 15, 2023.

(51) Int. Cl.
*H01J 49/00* (2006.01)
*G01N 30/02* (2006.01)
(Continued)

(52) U.S. Cl.
CPC ...... *H01J 49/0095* (2013.01); *G01N 30/7233* (2013.01); *G01N 30/88* (2013.01);
(Continued)

(58) Field of Classification Search
CPC .... H01J 49/0095; H01J 49/004; H01J 49/062; H01J 49/0027; H01J 49/0045;
(Continued)

(56) References Cited

U.S. PATENT DOCUMENTS 2,680,812 A * 6/1954 Berry .................... H01J 49/025 250/283
6,458,945 B1 * 10/2002 Stanton, Jr. .......... C12Q 1/6827 435/6.12

(Continued)

FOREIGN PATENT DOCUMENTS

GB 2481883 A * 1/2012 .......... H01J 49/0031
GB 2627217 A 8/2024
WO WO-2017221151 A1 * 12/2017 .......... H01J 49/0072

OTHER PUBLICATIONS

Kühn-Hölsken et al. "Complete MALDI-ToF MS analysis of cross-linked peptide-RNA oligonucleotides derived from nonlabeled UV-irradiated ribonucleoprotein particles," 2005, vol. 11, No. 12, pp. 1915-1930.

(Continued)

*Primary Examiner* — David A Vanore
(74) *Attorney, Agent, or Firm* — Thomas F. Cooney

(57) ABSTRACT

A data dependent acquisition method of mass spectrometry using a dual analyser mass spectrometer for analysing a sample comprises the steps of: ionising the sample to produce a plurality of precursor ions; performing, by a first mass analyser, an MS1 scan of the precursor ions from the sample and identifying precursor ions of interest; selecting and fragmenting precursor ions of interest to produce first fragmented ions, and performing, by a second mass analyser, MS2 scans of the first fragmented ions; selecting and fragmenting further precursor ions of interest to produce second fragmented ions, and performing, by the first mass analyser, MS2 scans of the second fragmented ions, wherein the second mass analyser operates in an opposite polarity to the first mass analyser so as to generate MS2 scans of fragmented ions having an opposite polarity to the fragmented ions of the MS2 scans generated by the first mass analyser.

23 Claims, 9 Drawing Sheets

(51) Int. Cl.
*G01N 30/72* (2006.01)
*G01N 30/88* (2006.01)
*H01J 49/06* (2006.01)

(52) U.S. Cl.
CPC .......... *H01J 49/004* (2013.01); *H01J 49/062* (2013.01); *G01N 2030/027* (2013.01); *G01N 2030/884* (2013.01)

(58) Field of Classification Search
CPC ............... G01N 30/7233; G01N 30/88; G01N 2030/027; G01N 2030/884
See application file for complete search history.

(56) References Cited

U.S. PATENT DOCUMENTS 6,545,268 B1 * 4/2003 Verentchikov .......... H01J 49/40 250/281
6,570,153 B1 * 5/2003 Li ....................... H01J 49/0081 250/282
2003/0001088 A1 1/2003 Bateman et al.
2004/0191916 A1 * 9/2004 Gross ..................... G01N 33/92 702/19
2005/0199804 A1 * 9/2005 Hunt ..................... H01J 49/423 250/290
2008/0191129 A1 * 8/2008 Makarov ................. H01J 49/04 250/282
2008/0203288 A1 * 8/2008 Makarov ............... H01J 49/004 250/288
2009/0026365 A1 * 1/2009 Satoh .................... H01J 49/004 250/287
2009/0072132 A1 * 3/2009 Manri ................. H01J 49/0045 250/282
2010/0059673 A1 * 3/2010 Makarov ............. H01J 49/0031 250/283
2010/0072360 A1 * 3/2010 Green ................... H01J 49/065 250/288
2011/0006203 A1 * 1/2011 Fujita .................. H01J 49/0045 250/288
2011/0186724 A1 * 8/2011 Nolting ............... H01J 49/4295 250/282
2013/0214148 A1 * 8/2013 Albeanu ............. H01J 49/0031 250/282
2014/0077076 A1 * 3/2014 Satoh .................... H01J 49/005 250/283
2015/0028197 A1 1/2015 Grinfeld et al.
2015/0028198 A1 * 1/2015 Grinfeld ............. H01J 49/0031 250/281
2015/0102219 A1 * 4/2015 Yamamoto ............ H01J 49/005 250/290
2015/0340213 A1 * 11/2015 Belov ..................... H01J 49/40 250/288
2016/0035549 A1 * 2/2016 Senko ................... H01J 49/009 250/282
2017/0047212 A1 * 2/2017 Kenny .................. H01J 49/004
2019/0378703 A1 * 12/2019 Baba ................... H01J 49/0054
2020/0328068 A1 10/2020 Giannakopulos
2020/0371073 A1 * 11/2020 Thoeing .................. H01J 49/40
2022/0384169 A1 * 12/2022 Zabrouskov ........ H01J 49/0004
2024/0030016 A1 * 1/2024 Takahashi ............. H01J 49/005
2024/0274425 A1 * 8/2024 Viner .................... H01J 49/004
2024/0395533 A1 * 11/2024 Stewart ............... H01J 49/4215
2025/0046593 A1 * 2/2025 Stewart .............. G01N 30/8637

OTHER PUBLICATIONS

Kühn-Hölsken et al. "Detection of Protein-RNA Crosslinks by NanoLC-ESI-MS/MS Using Precursor Ion Scanning and Multiple Reaction Monitoring (MRM) Experiments," Journal of American of Mass Spectrometry, May 2007, vol. 5, pp. 869-891.
Urlaub et al. "Identification and Sequence Analysis of Contact Sites between Ribosomal Proteins and rRNA in *Escherichia coli* 30 S Subunits by a New Approach Using Matrix-assisted Laser Desorption/Ionization-Mass Spectrometry Combined with N-terminal Microsequencing" The Journal of Biological Chemistry, June 6, 1197, vol. 272, No. 23, pp. 14547-14555.

* cited by examiner

MASS SPECTROMETER AND DATA ACQUISITION METHODS FOR IDENTIFICATION OF POSITIVE AND NEGATIVE ANALYTE IONS

CROSS REFERENCE TO RELATED APPLICATION

This application claims, under 35 USC § 119(e), priority to and the benefit of the filing date of U.S. Provisional application No. 63/485,043, which was filed on Feb. 15, 2023 and which is titled "Mass Spectrometer and Data Acquisition Methods for Identification of Positive and Negative Analyte Ions", the disclosure of which is hereby incorporated by reference herein in its entirety.

TECHNICAL FIELD

The present invention relates to methods of analysis of nucleic acid-protein complexes and other analytes using tandem mass spectrometry. There are provided methods for obtaining scans of positive and negative ions acquired by fragmentation of the sample.

BACKGROUND

Mass spectrometry is a long established technique for identification and quantification of a wide range of biological and non-biological materials, often including complex mixtures of large organic molecules.

Many fundamental biological processes depend on intricate networks of interactions between proteins and nucleic acids and site identification of such interactions is important for understanding cellular mechanisms such as DNA replication, transcription, or translation. A wide variety of methods have been developed to evaluate interactions between proteins and nucleic acids both in vivo and in vitro. However, each method has its limitations and a combination of several techniques are often applied for the analysis of a particular interaction including current state of the art mass-spectrometer-based analysis of crosslinked protein-NA samples.

Accurate identification and quantification of proteins and nucleic acids by direct mass spectrometric measurement is not possible. It is known to carry out fragmentation of the ionised sample material, which is considered a precursor ion. A variety of fragmentation techniques are known, which may result in the generation of different fragment ions from the precursor ions. To identify and quantify proteins and nucleic acids requires the use of fragmentation.

Analysis of a sample by fragmentation often requires a full mass or MS1 scan to be performed first, followed by fragmentation and a subsequent scan, denoted an MS/MS or MS2 scan, to analyse the fragmented ions. In more detail, a mass spectrometer may first be used to mass analyse all sample ions (precursor ions) within a selected mass-to-charge ratio (m/z) range. This is the MS1 scan. Secondly, the sample ions may be fragmented and mass analysed. In this second step, sample ions from a narrow window of the mass-to-charge ratio range may be selected, fragmented and the resulting fragments mass analysed. The mass analyser itself may still scan a similar wide range of mass-to charge ratios as for the MS1 scan because after fragmentation the ions may have a similarly wide mass-to charge ratio range. The scan of the fragmented ions is the MS2 scan. Multiple MS2 scans are commonly performed because the narrow window of the mass-to-charge ratio selected for each MS2 scan may be smaller than that of the precursor ion scan. The multiple MS2 scans may be used to cover a desired range of sample ion mass-to charge ratios.

The majority of mass spectrometric studies are performed via positive ion detection, however many analytes, such as acidic peptides and some classes of lipids, are far more amenable to negative ionization and detection. It is common for commercial mass spectrometer instruments to be switchable between positive and negative ion modes, even down to the timescale of analyte introduction to the mass spectrometer, which from liquid/gas chromatography separation may be <500 ms, and preferably <50 ms, to be able to take multiple spectra across the chromatography peaks that may have a duration of the order of a second.

Nucleic acid (NA)-protein complexes play important roles in many central biological processes. Although methods based on high throughput sequencing have advanced the ability to identify specific NAs bound by a particular protein there is a need for precise and systematic methods of identifying NA interaction sites on the proteins.

Urlaub et al. ("Identification and Sequence Analysis of Contact Sites between Ribosomal Proteins and rRNA in *Escherichia coli* 30 S Subunits by a New Approach Using Matrix-assisted Laser Desorption/Ionization-Mass Spectrometry Combined with N-terminal Microsequencing", JBC, 1997, v. 272, p 14547-14555) describes recording mass spectra of cross-linked peptide-oligoribonucleotide complexes by using MALDI (matrix-assisted laser desorption/ionization) mass spectrometry with a time of flight analyser operating in linear mode. MALDI is an ionization technique in which the sample is mixed with a suitable matrix material to which a pulsed laser is applied. The sample is obtained in the gas phase and is then ionized by protonation or deprotonation in the hot plume of ablated gases. In this method ions are produced with minimal fragmentation which can be useful for large molecules such as proteins and peptides. The MALDI approach in combination with partial alkaline hydrolysis and sequencing allowed the cross-linking positions to be determined.

Kühn-Hölsken et al. ("Complete MALDI-ToF MS analysis of cross-linked peptide-RNA oligonucleotides derived from non-labelled UV-irradiated ribonucleoprotein particles", RNA. 2005 December; 11(12), 1915-30) describes a related technique, again using MALDI-ToF MS analysis, to determine cross-linking sites in protein-RNA complexes such as purified peptide-RNA oligonucleotide cross-links. The method provided an improved MALDI matrix for analysis of cross-linked peptide-RNA oligonucleotides.

Lenz et al. ("Detection of protein-RNA crosslinks by NanoLC-ESI-MS/MS using precursor ion scanning and multiple reaction monitoring (MRM) experiments", J. Am. Soc. Mass. Spectrom. 2007 May; 18(5), 869-81) describes a method of detecting and sequencing peptide-RNA oligonucleotide crosslinks. The method used hydrolysis of the protein and RNA moieties and purification of the crosslinked peptide-RNA oligonucleotides by liquid chromatography. Mass spectrometry was by an electrospray ionization (ESI) hybrid triple quadrupole/linear ion-trap mass spectrometer.

For unambiguous identification of NA interaction sites there remains a need for an improved approach. Prior art approaches of identifying peptides and oligonucleotides resulting from cross-linking using mass spectrometry indicate that identification of peptide moiety and oligonucleotide moiety requires different polarities to be respectively used for these moieties at the fragmentation step and subsequent MS2 ion analysis. Switching the polarity of mass analysers to achieve this severely reduces the time for spectral acquisition and reduces the number of acquisitions possible in a chromatographic peak. Alternatively, multiple runs and different setups may be used to achieve the dual polarity scans required but this also adds time and complexity. Hence, it is desirable to provide methods that overcome the difficulties in obtaining dual polarity scans so as to improve the identification of protein-NA interaction sites.

SUMMARY OF THE INVENTION

The present invention is directed to methods of analysing positive and negative ions produced from sample, such as from elution of molecules from a peak in liquid chromatography. The methods are particularly applicable to analysing nucleic acid-protein complexes and identifying interaction sites therein, but may also be applied to lipids or phospho- or glycopeptides. The method comprises using a dual analyser mass spectrometer with the two analysers respectively operating to identify opposite polarity ions and switching the ion source to alternately direct positive ions to one analyser and negative ions to the other analyser.

The method is applicable to elucidate the structure and/or confirm the composition of any mixed moieties molecules such as nucleic acid-protein complexes, phospho- and glycopeptides or lipids. The method may comprise a survey scan to identify molecules, for example, as crosslinked peptides or glycopeptides which then can trigger the full analysis in either negative or positive polarity. A time-of-flight (ToF) analyser and/or other analyser may be used for the subsequent scans. A ToF analyser may perform the subsequent scans more quickly than other analysers allowing more scans to be performed thereby improving data quality.

Embodiments of the present invention provide a data dependent acquisition (DDA) method of mass spectrometry using a dual analyser mass spectrometer for analysing a sample. The method may be performed within a time period based on a width of a chromatographic peak of the sample as it elutes from a chromatography system. The method comprises the steps of: ionising the sample to produce a plurality of precursor ions; performing, by a first mass analyser, an MS1 scan of the precursor ions from the sample and identifying precursor ions of interest; selecting and fragmenting precursor ions of interest to produce first fragmented ions, and performing, by a second mass analyser, MS2 scans of the first fragmented ions; selecting and fragmenting further precursor ions of interest to produce second fragmented ions, and performing, by the first mass analyser, MS2 scans of the second fragmented ions, wherein the second mass analyser operates in an opposite polarity to the first mass analyser so as to generate MS2 scans of fragmented ions having an opposite polarity to the fragmented ions of the MS2 scans generated by the first mass analyser. The ionisation of the sample may be largely continuous or continuous over the width of the chromatographic peak, except for a time when the ion source is switching polarity. The ions from the source may be respectively directed to the first analyser for performing the MS1 scan, a fragmentation apparatus for fragmenting ions for the second analyser to perform the MS2 scans of first fragmented ions, and a fragmentation apparatus for fragmenting ions for the first analyser to perform the MS2 scans of second fragmented ions. The same or different fragmentation apparatus may be used for fragmenting the ions for the MS2 scans by the first analyser and for the MS2 scans by the second analyser. The order in which the ions from the source may be directed to the different analysers and scans may be different from this order. The ions may be aggregated or accumulated, such as in an ion trap, to form packets of ions before directing them for fragmentation and/or before directing them to the first and/or second analyser.

The MS1 scan at a first polarity may be used to identify precursor ions of interest for fragmentation and MS2 analysis in both polarities.

The second mass analyser may perform the MS2 scans of the first fragmented ions at the same time, or while, the first mass analyser is performing the MS1 scan of the precursor ions. That is, during an effective deadtime in which the first mass analyser is performing the MS1 scan, ions from the ion source and ion guides may be directed to the second mass analyser and the second analyser may perform MS2 scans.

The ion source and ion guides, for ionizing and guiding ions from the source to the analysers of the dual analyser mass spectrometer, may be polarity switched between performing the MS2 scans of the first fragmented ions by the second analyser and performing MS2 scans of the second fragmented ions by the first analyser. The ion source and guides switch relatively much more rapidly than the mass analysers and therefore temporally more of the ions from the source can be analysed than if the mass analysers were polarity switched.

The ion source and ion guides may be polarity switched between injecting the precursor ions into the first mass analyser for the MS1 scan and injecting the first fragmented ions into the second mass analyser for the MS2 of the first fragmented ions.

At the same time as the first mass analyser is performing the MS1 scan, the first fragmented ions may be injected into the second mass analyser and the second mass analyser may successively perform MS2 scans such as on the fragmented ions and subsequent fragmented ions.

The first mass analyser may operate in a first polarity mode for performing the MS1 scan of the precursor ions and the MS2 scans of the second fragmented ions, and the second mass analyser may operate in a second polarity mode for performing the MS2 scans of the first fragmented ions. During the time period based on the width of the chromatographic peak or multiple peaks of the sample, the first mass analyser may be maintained at a first polarity and the polarity of the first analyser is not switched and the second mass analyser may be maintained at a second polarity and the polarity of the second analyser is not switched.

During a cycle comprising a first period for which ion source and ion guides are maintained at a first polarity and a second period for which the ion source and ion guides are maintained at a second polarity opposite to the first polarity, the mass spectrometer may perform the MS1 scan, the MS2 scans of the first fragmented ions and the MS2 scans of the second fragmented ions.

The ion source and ion guides may be polarity switched between performing a last MS2 scan of the first fragmented ions in a cycle and performing a first MS2 scan of the second fragmented ions. This polarity switching may be a second time in a cycle and may correspond to a time after injecting fragmented ions into the second mass analyser for performing a last MS2 scan of the first fragmented ions in a cycle.

The method may further comprise repeating the cycle. This may require stopping the first mass analyser performing MS2 scans on the second fragmented ions and initiating the first mass analyser to perform an MS1 scan, following which MS2 scans by the second and first mass analysers may be performed as set out above.

The first mass analyser may be operated in a positive polarity mode and the second mass analyser may be operated in negative polarity mode, or vice versa.

The ion source and ion guides may preferably switch polarity from the first polarity to the second polarity in less than 50 ms, less than 100 ms, less than 200 ms or less than 500 ms.

The dual analyser mass spectrometer may comprise one or more ion traps such as curved linear ion traps or C-traps. The method may comprise, at least one of the one or more ion traps, aggregating or collecting ions ionised by an ion source to form packets of ions, and, by the at least one ion trap, directing packets of ions to the first mass analyser and/or to the second mass analyser.

The first and second mass analysers may be high resolution accurate mass (HRAM) analysers. High resolution accurate mass (HRAM) analysers are analysers preferably having a resolving power of the order of, or greater than, around 10,000, and preferably having a mass accuracy of better than around 10 ppm. The first mass analyser may be an orbital trapping mass analyser and the second mass analyser may be a time-of-flight mass analyser. Other types of mass analyser may also be used.

Embodiments further provide a method of analysing protein-nucleic acid complexes, comprising: cross-linking the protein-nucleic acid complex and digesting the complex to produce a sample comprising cross-linked peptides-oligonucleotides (also described as cross-linked peptides and oligonucleotides); performing a data dependent acquisition method of mass spectrometry on the sample by introducing the sample into a liquid chromatography-mass spectrometer (LC-MS) system, the data dependent method performed within a time period based on a width of a chromatographic peak of the sample as it elutes from the chromatography system of the LC-MS system, the data dependent method comprising the steps set out herein; and analysing one or more of the MS2 scans to sequence and/or determine interaction sites in the protein-nucleic acid complex.

The method may further comprise enriching the digested complex prior to performing the LC-MS steps.

The step of digesting may comprise digesting the cross-linked protein-nucleic acid complex using not only multiple but a single type of nuclease.

The peptides may be analysed by positive polarity MS2 scans and the oligonucleotides may be analysed by negative MS2 scans.

The step of analysing the one or more MS2 scans to sequence and/or determine interaction sites in the protein-nucleic acid complex may comprise: identifying a peptide or a sequence tag of a peptide present in the sample based on data from one or more MS2 scans; searching a library for RNA or DNA mass adducts based on a mass difference between the peptide and adduct, wherein the adduct may be related to the cross-linking; and based on the mass difference localizing a cross-linking site within the peptide.

Embodiments provide a mass spectrometer, comprising: an ion source and ion guides/processing region, the ion source for producing a plurality of precursor ions from sample molecules and the ion guides/processing region for guiding the precursor ions; fragmentation apparatus for fragmenting precursor ions; a first mass analyser; a second mass analyser; and a controller configured to cause the mass spectrometer to perform the methods set out herein. Embodiments provide an analytical instrument comprising the mass spectrometer set out herein and a chromatography system configured to separate molecules of a sample and provide the molecules to a mass spectrometer.

Embodiments further provide a computer program comprising computer program instructions, which when run on a computer or controller configured to control an analytical instrument cause the analytical instrument to execute the steps of any of the methods set out herein.

BRIEF DESCRIPTION OF THE DRAWINGS

Embodiments of the present invention, and aspects of the prior art, will now be described with reference to the accompanying drawings, of which.

DETAILED DESCRIPTION

Figure 1:
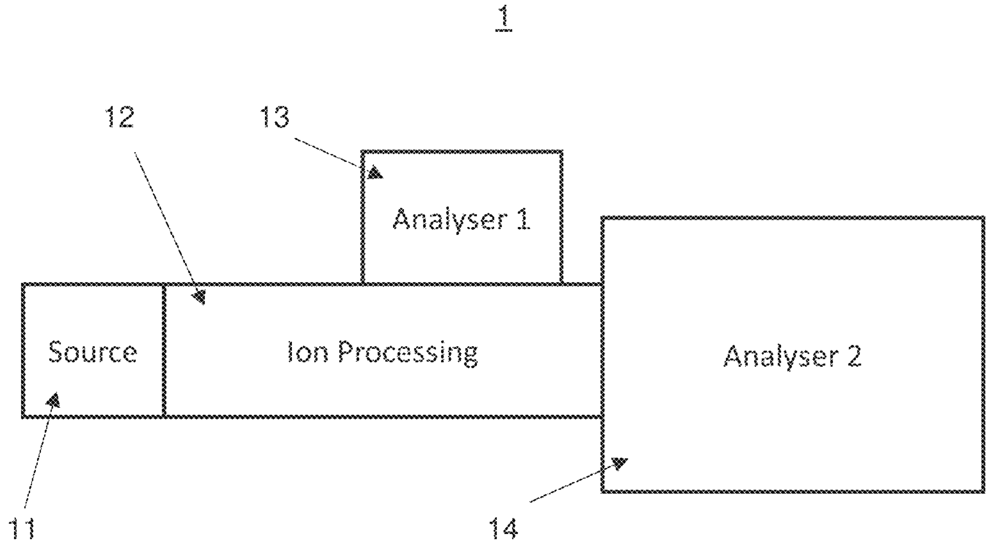
FIG. 1 is a schematic layout of a dual analyser hybrid mass spectrometer.

The following description is presented to enable any person skilled in the art to make and use the invention and is provided in the context of a particular application and its requirements. Various modifications to the described embodiments will be readily apparent to those skilled in the art and the generic principles herein may be applied to other embodiments. Thus, the present invention is not intended to be limited to the embodiments and examples shown but is to be accorded the widest possible scope in accordance with the features and principles shown and described. To fully appreciate the features of the present invention in greater detail, please refer to FIGS. 1-9 in conjunction with the following description.

In the description of the invention herein, it is understood that a word appearing in the singular encompasses its plural counterpart, and a word appearing in the plural encompasses its singular counterpart, unless implicitly or explicitly understood or stated otherwise. Furthermore, it is understood that, for any given component or embodiment described herein, any of the possible candidates or alternatives listed for that component may generally be used individually or in combination with one another, unless implicitly or explicitly understood or stated otherwise. Additionally, it will be understood that any list of such candidates or alternatives is merely illustrative, not limiting, unless implicitly or explicitly understood or stated otherwise. Moreover, it is to be appreciated that the figures, as shown herein, are not necessarily drawn to scale, wherein some of the elements may be drawn merely for clarity of the invention. Furthermore, one skilled in the art can readily appreciate that the specific sequences in which methods are presented and performed are illustrative and it is contemplated that the sequences can be varied and still remain within the spirit and scope of the various embodiments disclosed herein. It should be noted that reference numerals may be repeated among the various figures to show corresponding or analogous elements.

Unless otherwise defined, all other technical and scientific terms used herein have the meaning commonly understood by one of ordinary skill in the art to which this invention belongs. In case of conflict, the present specification, including definitions, will control. It will be appreciated that there is an implied "about" prior to the quantitative terms mentioned in the present description, such that slight and insubstantial deviations are within the scope of the present teachings. In addition, the use of the words "comprise", "comprises", "comprising", "contain", "contains", "containing", "include", "includes", and "including" are not intended to be limiting. As used herein, "a" or "an" also may refer to "at least one" or "one or more." Also, the use of "or" is inclusive, such that the phrase "A or B" is true when "A" is true, "B" is true, or both "A" and "B" are true.

As mentioned, a problem with attempting to analyse positive and negative ions, such as peptides and oligonucleotides, is that in a mass spectrometer with a single mass analyser, the measurements become dominated by the time demands of polarity switching of the analyser. For example, moving polarity back and forth on a commercial orbital trapping analyzer, such as the Orbitrap™ Exploris™ instrument, takes almost a second, which greatly limits the number of spectra that can be acquired in a single chromatographic peak if polarity switching takes place at some point during the peak. The switching time of the orbital trapping analyser is the time limiting step. The orbital trapping analyzer's applied potentials take around 400 ms to switch polarity because the HV supplies are required to fully stabilize before measurement can recommence. The ion source and interface guides do not require stable HV supplies, so they may switch polarity more rapidly, within around 10 ms.

A more time efficient method therefore would be to incorporate a second mass analyser, using one mass analyser for positive spectra and the other mass analyser for negative spectra, with the ion source rapidly polarity switching to alternately supply ions to both.

We now describe an embodiment of an apparatus for obtaining positive and negative polarity scans without sacrificing significant ion source time. Following discussion of the apparatus we describe embodiments of methods of obtaining positive and negative polarity scans, such as for peptides and oligonucleotides resulting from crosslinking of nucleic acid-protein complexes.

Apparatus

FIG. 1 shows a schematic arrangement of a mass spectrometer 1 suitable for carrying out methods in accordance with embodiments of the present invention. The mass spectrometer is a dual analyser mass spectrometer and comprises an ion source 11, such as an electrospray ionisation (ESI) source, an ion guide or processing region 12, which may comprise various electrodes to generate fields for refining and filtering the ion beam and selecting desired ion m/z ranges. In the arrangement shown in FIG. 1, the first analyser 13 is shown away from the direction of the axis of the ion beam in the ion processing region 12, such as transverse to it. The second analyser 14 is shown as terminating the direction of the ion beam in the ion processing region 12. Other arrangements of dual analysers may be provided and will be discussed later in this description.

A sample to be analysed may be supplied to the mass spectrometer 1 from a liquid chromatographic apparatus such as a liquid chromatography (LC) column 750. One such example of an LC column is the Thermo Fisher Scientific, Inc PepMap™ RSLC C18 column which offers high performance liquid chromatography (HPLC) through the forcing of the sample carried in a mobile phase under high pressure through a stationary phase of irregularly or spherically shaped particles constituting the stationary phase. In the HPLC column, sample molecules elute at different rates according to their degree of interaction with the stationary phase. A chromatograph may be produced by measuring over time the quantity of sample molecules which elute from the HPLC column using a detector, which is the mass spectrometer.

Sample molecules which elute from the HPLC column 750 will be detected as a peak above a baseline measurement on the chromatograph. Where different sample molecules have different elution rates, a plurality of peaks on the chromatograph may be detected. Preferably, individual sample peaks are separated in time from other peaks in the chromatogram such that different sample molecules do not interfere with each other. On a chromatograph, a presence of a chromatographic peak corresponds to a time period over which the sample molecules are present at the detector. As such, a width of a chromatographic peak is equivalent to a time period over which the sample molecules are present at the detector. Preferably, a chromatographic peak has a Gaussian shaped profile, or can be assumed to have a Gaussian shaped profile. Accordingly, a width of the chromatographic peak can be determined based on a number of standard deviations calculated from the peak. For example, a peak width may be calculated based on 4 standard deviations of a chromatographic peak. Alternatively, a peak width may be calculated based on the width at half the maximum height of the peak. Other methods for determining the peak width known in the art may also be suitable. The sample molecules thus separated via liquid chromatography are then provided to the mass spectrometer ion source 11.

Figure 2:
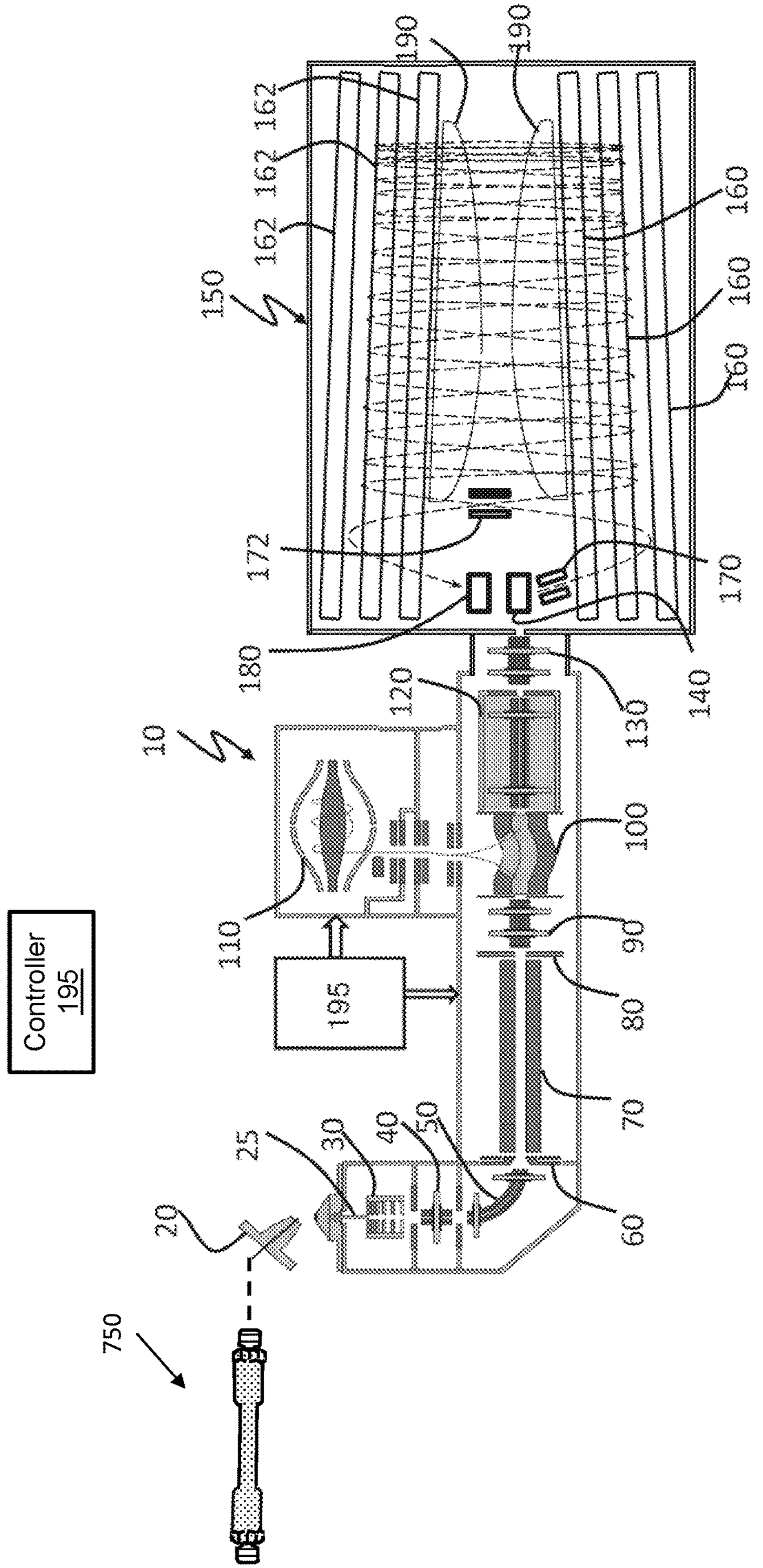
FIG. 2 is a schematic diagram of a dual analyser mass spectrometer for carrying out the present invention.

We now describe with reference to FIG. 2 a detailed example of a dual analyser mass spectrometer of FIG. 1 that is configured for tandem mass spectrometry. Other instruments configured for tandem MS may be used. The instrument is required to have two high-resolution accurate mass (HRAM) analysers. The mass spectrometer of FIG. 2 includes an orbital trapping mass analyser and a multi-reflection time-of-flight (MR-ToF) analyser, but other combinations of analysers may be used.

The dual analyser mass spectrometer 10 of FIG. 2 comprises as the ion source an electrospray ionization source (ESI source) 20 which is at atmospheric pressure. The sample molecules received from the HPLC column 750 are ionized by the ESI source 20. Ions produced from the sample then enter a vacuum chamber of the mass spectrometer 10 and are directed by a capillary 25 into an RF-only S lens 30. The ions are focused by the S lens 30 into an injection flatapole 40 which injects the ions into a bent flatapole 50 with an axial field. The bent flatapole 50 guides (charged) ions along a curved path through it whilst unwanted neutral molecules such as entrained solvent molecules are not guided along the curved path and are lost.

An ion gate (TK lens) 60 is located at the distal end of the bent flatapole 50. The ion gate may be an ion lens with static fields providing good fringe field properties and transmitting ions cleanly to quadrupole mass filter 70. In some embodiments, the ion gate may control the passage of the ions from the bent flatapole 50 to the quadrupole mass filter 70. The quadrupole mass filter 70 is typically but not necessarily segmented and serves as a band pass filter, allowing passage of a selected mass number or limited mass range whilst excluding ions of other mass to charge ratios (m/z). The mass filter can also be operated in an RF-only mode in which it is not mass selective, i.e., it transmits substantially all m/z ions. For example, the quadrupole mass filter 70 may be controlled by controller 195 to select a range of mass to charge ratios to pass of the precursor ions which are allowed to pass, whilst the other ions in the precursor ion stream are filtered (i.e., not allowed to pass). Alternatively, the S lens 30 may be operated as an ion gate and the ion gate (TK lens) 60 may be a static lens.

Although a quadrupole mass filter is shown in FIG. 2, the skilled person will appreciate that other types of mass selection devices may also be suitable for selecting precursor ions within the mass range of interest. For example, an ion separator as described in US-A-2015287585, an ion trap as described in WO 2013/076307 A, an ion mobility separator as described in US 2012/256083 A, an ion gate mass selection device as described in WO 2012/175517 A, or a charged particle trap as described in U.S. Pat. No. 799,223, the contents of which are hereby incorporated by reference in their entirety. The skilled person will appreciate that other methods of selecting precursor ions according to ion mobility, differential mobility and/or transverse modulation may also be suitable.

The isolation of a plurality of ions of different masses or mass ranges may also be performed using the method known as synchronous precursor scanning (SPS) in an ion trap. Furthermore, in some embodiments, more than one ion selection or mass selection device may be provided. For example, a further mass selection device may be provided downstream of the fragmentation chamber 120. In this way, $MS^3$ or $MS^n$ scans can be performed if desired (typically using the ToF mass analyser for mass analysis).

Following mass selection, ions pass through a quadrupole exit lens/split lens arrangement 80 and into a first transfer multipole 90. The quadrupole exit lens/split lens arrangement 80 may be used to control admission of ions to mass analysers. The first transfer multipole 90 guides the mass filtered ions from the quadrupole mass filter 70 into a curved linear ion trap (C-trap) 100. The C-trap (first ion trap) 100 has longitudinally extending, curved electrodes which are supplied with RF voltages and end caps to which DC voltages are supplied. The result is a potential well that extends along the curved longitudinal axis of the C-trap 100. In a first mode of operation, the DC end cap voltages are set on the C-trap so that ions arriving from the first transfer multipole 90 are captured in the potential well of the C-trap 100, where they are cooled. The injection time (IT) of the ions into the C-trap determines the number of ions (ion population) that is subsequently ejected from the C-trap into the mass analyser.

Cooled ions reside in a cloud towards the bottom of the potential well and are then ejected orthogonally from the C-trap towards the first mass analyser 110. As shown in FIG. 2, the first mass analyser is an orbital trapping mass analyser 110, also known as an Orbitrap® mass analyser sold by Thermo Fisher Scientific, Inc. The orbital trapping mass analyser 110 has an off-centre injection aperture and the ions may be injected into the orbital trapping mass analyser 110 as coherent packets, through the off-centre injection aperture. Ions are then trapped within the orbital trapping mass analyser by a hyperlogarithmic electric field, and undergo back and forth motion in a longitudinal direction whilst orbiting around the inner electrode.

The axial (z) component of the movement of the ion packets in the orbital trapping mass analyser is (more or less) defined as simple harmonic motion, with the angular frequency about the z-axis direction being related to the square root of the mass to charge ratio of a given ion species. Thus, over time, ions separate in accordance with their mass to charge ratio.

Ions in the orbital trapping mass analyser 110 are detected by use of an image detector (not shown) which produces a "transient" in the time domain containing information on all of the ion species as they pass the image detector. The transient is then subjected to a Fast Fourier Transform (FFT) resulting in a series of peaks in the frequency domain. From these peaks, a mass spectrum, representing abundance/ion intensity versus m/z, can be produced.

In the configuration described above, the sample ions (more specifically, a mass range segment of the sample ions within a mass range of interest, selected by the quadrupole mass filter 70) are analysed by the orbital trapping mass analyser without fragmentation. The resulting mass spectrum is denoted MS1.

If it is desired to perform an MS2 scan using the orbital trapping analyser, the mass spectrometer operates in a second mode in which it is necessary to first fragment the ions. In such a case the ions are delivered through to the fragmentation chamber 120 for cooling and fragmentation. The fragmented ions are then shuttled back to the C-trap 100 where they are pulse extracted into the orbital trapping analyser 110 for mass analysis.

In this second mode of operation, ions passing through the quadrupole exit lens/split lens arrangement 80 and first transfer multipole 90 into the C-trap 100 continue their path through the C-trap and into the fragmentation chamber 120. As such, the C-trap effectively operates as an ion guide in the second mode of operation. The fragmentation chamber 120 is, in the mass spectrometer 10 of FIG. 2, a higher energy collisional dissociation (HCD) device to which is supplied a collision gas, such as an inert gas, for example, argon, nitrogen or helium. Precursor ions arriving into the fragmentation chamber 120 collide with collision gas molecules resulting in fragmentation of the precursor ions into fragment ions.

Although an HCD fragmentation chamber 120 is shown in FIG. 2, other fragmentation devices may be employed instead, employing such methods as collision induced dissociation (CID), electron capture dissociation (ECD), electron transfer dissociation (ETD), photodissociation, and so forth.

As mentioned above, for MS2 analysis by the orbital trapping analyser 110 the fragmented ions are shuttled back to the C-trap 100 and directed transversely to the C-trap axis towards the orbital trapping analyser 110. Alternatively, MS2 analysis may be performed by a second mass analyser, which as shown in the embodiment of FIG. 2 may be a time-of-flight (ToF) mass analyser 150. In such a case the fragmented ions may be ejected from the fragmentation chamber 120 at the opposing axial end to the C-trap 100. The ejected fragmented ions pass into second transfer multipole 130. The second transfer multipole 130 guides the fragmented ions from the fragmentation chamber 120 into the extraction trap (second ion trap) 140. The extraction trap 140 is a radio frequency voltage-controlled trap containing a buffer gas. For example, a suitable buffer gas is argon at a pressure in the range $5\times10^{-4}$ mBar to $1\times10^{-2}$ mBar. The extraction trap has the ability to quickly switch off the applied RF voltage and apply a DC voltage to extract the trapped ions. A suitable flat plate extraction trap, also referred to as a rectilinear ion trap, is further described in U.S. Pat. No. 9,548,195 (B2). Alternatively, a C-trap may also be suitable for use as a second ion trap.

The extraction trap 140 is provided to form an ion packet of fragmented ions, prior to injection into the second analyser. The extraction trap 140 accumulates fragmented ions prior to injection of the fragmented ions into the time-of-flight mass analyser 150.

Although an extraction trap (ion trap) is shown in the embodiment of FIG. 2, the skilled person will appreciate that other methods of forming an ion packet of fragmented ions will be equally suitable for the present invention. For example, relatively slow transfer of ions through a multipole can be used to affect bunching of ions, which can subsequently be ejected as a single packet to the ToF mass analyser. Alternatively orthogonal displacement of ions may be used to form a packet. Further details of these alternatives are found in US 2003/0001088 A1 which describes a travelling wave ion bunching method, the contents of which are herein incorporated by reference.

In FIG. 2, the time-of-flight mass analyser 150 shown is a multiple reflection time of flight mass analyser (MR-ToF) 150. The MR-ToF 150 is constructed around two opposing ion mirrors 160, 162, elongated in a drift direction. The mirrors are opposed in a direction that is orthogonal to the drift direction. The extraction trap 140 injects ions into the first mirror 160 and the ions then oscillate between the two mirrors 160, 162. The angle of ejection of ions from the extraction trap 140 and additional deflectors 170, 172 allow control of the energy of the ions in the drift direction, such that ions are directed down the length of the mirrors 160, 162 as they oscillate, producing a zig-zag trajectory. The mirrors 160, 162 themselves are tilted relative to converge towards one another, producing a potential gradient that retards the ions' drift velocity and causes them to be slightly reflected back in the drift dimension with each oscillation eventually halting their lengthways drift down the length of the analyser and focusing them onto ion detector 180. The ion detector is mounted back-to-back with the extraction trap 140. The tilting of the opposing mirrors would normally have the negative side-effect of changing the time period of ion oscillations as they travel down the drift dimension. This is corrected with a stripe electrode 190 (to act as a compensation electrode) that alters the flight potential for a portion of the inter-mirror space, varying down the length of the opposing mirrors 160, 162. The combination of the varying width of the stripe electrode 190 and variation of the distance between the mirrors 160, 162 allows the reflection and spatial focusing of ions onto the detector 180 as well as maintaining a good time focus. A suitable MR-ToF analyser 150 for use in the present invention is further described in US 2015/028197 A1, the contents of which are hereby incorporated by reference in its entirety.

We have described above a number of modes of operation. Firstly, we described that an MS1 scan may be performed by the first mass analyser (the orbital trapping mass analyser 110). Secondly, we described that the precursor ions may be fragmented and MS2 scans may be performed by the first mass analyser (the orbital trapping mass analyser 110) or the second mass analyser (the time-of-flight mass analyser) depending on whether the fragmentation chamber is controlled to eject the ions back towards the C-trap 100 or forwards to the second transfer multipole 130. In a further mode of operation, the second mass analyser (time-of-flight mass analyser 150) may perform MS1 scans of ions. In this mode of operation, the ions are directed axially through the C-trap 100 to the fragmentation chamber, but no fragmentation gases are input and the ions are guided to the second transfer multipole 130 without fragmentation. The ions can then be accumulated into packets in the extraction trap 140 as described above.

Returning to FIG. 2, ions accumulated in the extraction trap may be injected into the MR-ToF analyser 150 as a packet of ions, once a predetermined number of ions have been accumulated in the extraction trap. By ensuring that each packet of ions injected into the MR-ToF 150 has at least a predetermined (minimum) number of ions, the resulting packet of ions arriving at the detector will be representative of the entire mass range of interest of the MS2 spectrum. A single packet of precursor or fragmented ions is sufficient to acquire MS1 or MS2 spectra respectively. For MS2, this represents an increased sensitivity compared to conventional acquisition of time-of-flight spectra in which multiple spectra typically are acquired and summed for each given mass range segment. Preferably, a minimum total ion current (TIC) in each mass window is accumulated in the extraction trap before injection to the time-of-flight mass analyser. For example, at least N spectra (scans) are acquired per second in the MS2 domain by the time-of-flight mass analyser, wherein N=50, or more preferably 100, or 200, or more.

Preferably, at least X % of the MS2 scans contain more than Y ion counts (wherein X=30, or 50, or 70, or most preferably 90, or more, and Y=200, or 500, or 1000, or 2000, or 3000, or 5000, or more). Most preferably, at least 90% of the MS2 scans contain more than 500 ion counts, or more preferably more than 1000 ion counts, and ideally more than 5000 ion counts. This provides for an increased dynamic range of MS2 spectra. The desired ion counts for each of the MS2 scans may be provided by adjusting the number ions included in each packet of fragmented ions. For example, in the embodiment of FIG. 2, the accumulation time of the extraction trap may be adjusted to ensure that a sufficient number of ions have been accumulated. As such, the controller 195 may be configured to determine that a suitable packet of fragmented ions has been formed when either a predetermined number of ions are present in the extraction trap, or a predetermined period of time has passed. The predetermined period of time may be specified in order to ensure that the time-of-flight mass analyser operates at the desired frequency when the flow of ions to the extraction trap is relatively low.

The mass spectrometer 10 is under the control of a controller 195 which, for example, is configured to control the timing of ejection of the trapping components, to set the appropriate potentials on the electrodes of the quadrupole etc. so as to focus and filter the ions, to capture the mass spectral data from the orbital trapping device 110, to capture the mass spectral data from the MR-ToF 150, control the sequence of MS1 and MS2 scans and so forth. It will be appreciated that the controller 195 may comprise a computer that may be operated according to a computer program comprising instructions to cause the mass spectrometer to execute the steps of the method according to the present invention.

It is to be understood that the specific arrangement of components shown in FIG. 2 is not essential to the methods subsequently described. Indeed, other arrangements for carrying out the methods of embodiments of the present invention are suitable.

Although an orbital trapping mass analyser 110 is shown in FIG. 2, other Fourier Transform mass analysers may be employed instead. For example, a Fourier Transform Ion Cyclotron Resonance (FTICR) mass analyser may be utilised as mass analyser for the MS1 scans.

Mass analysers, such as the orbital trapping mass analyser and Ion Cyclotron Resonance mass analyser, may also be used in the invention even where other types of signal processing than Fourier transformation are used to obtain mass spectral information from the transient signal (see for example WO 2013/171313).

Figure 3:
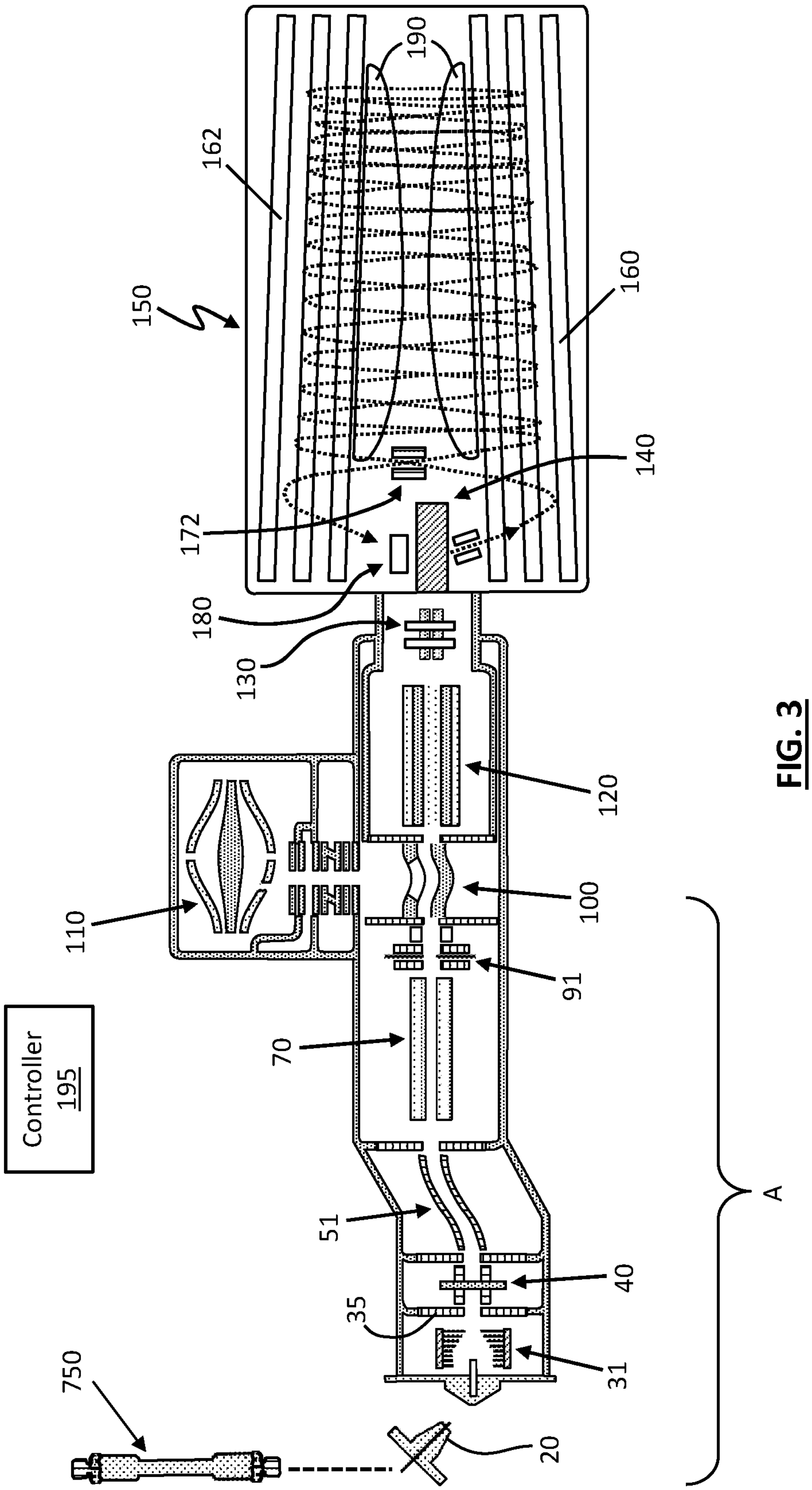
FIG. 3 is a schematic diagram of an alternative dual analyser mass spectrometer for carrying out the present invention.

FIG. 3 shows an alternative mass spectrometer suitable for performing the methods of the present invention. This alternative is similar to the arrangement of FIG. 2 and like reference numbers indicate like components. The apparatus of FIG. 3 differs in the region A at the entrance to the mass spectrometer compared to the apparatus shown in FIG. 2. The arrangement of FIG. 3 does not have the folded path arrangement of that of FIG. 2, having a more linear ion beam path. The arrangement of FIG. 2 has the same electrospray ion (ESI) source 20 and capillary 25. The S-lens 30 is replaced by a more conventional ion funnel 31 although serving the same ion focusing function. At 35 is provided a calibrant source which was not present in the apparatus of FIG. 2. This is followed by an injection flatapole or quadrupole pre-filter 40. The bent flatapole ion guide 51 in FIG. 3 differs from that of the bent flatapole of FIG. 2 in the shape that it takes. In FIG. 2 the ion path bends through 90° whereas in FIG. 3 the ion path follows an s-path with the output direction of the ion beam path parallel to the input. The quadrupole mass filter 70 of FIG. 3 is unchanged from that of FIG. 2. The first transfer multipole 90 of FIG. 2 is replaced by a charge detector 91, although this may incorporate a transfer multipole.

An example method will now be described with reference to FIG. 4, in which sample molecules are supplied from a liquid chromatography (LC) column 750 to the exemplary apparatus shown in FIG. 2. The sample ions are supplied from the LC column 750 to acquire data about the sample over a duration corresponding to a duration or width (such as the full width) of a chromatographic peak of the sample supplied from the LC column. Data may be acquired for the entire elution period, that is for all of the peaks across the elution period. The elution period is usually controlled by the length of a solvent gradient (a switch between pumping aqueous solvent over a column to organic solvent). Mass scans may be collected over a repeating cycle within each peak and/or across the elution period. It is preferable if each scan, or scan cycle, for a mass range of interest or list of precursors occurs over a duration or timescale less than, or corresponding to, the elution of a chromatographic peak.

Figure 4:
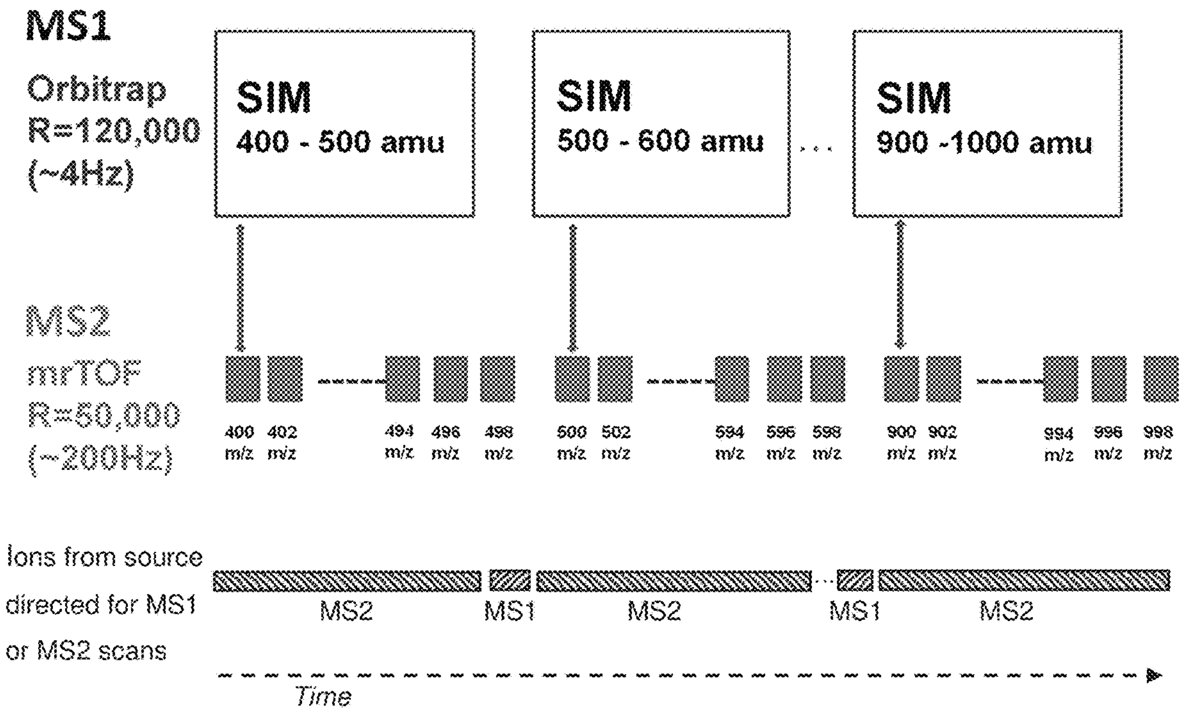
FIG. 4 is diagram showing example timings of performing MS1 and MS2 scans.

As shown in FIG. 4, the orbital trapping mass analyser (denoted "Orbitrap") is utilised to perform a plurality of MS1 scans across a mass range of interest. For example, as shown in FIG. 4, the mass range of interest (or Selected Ion Monitoring, SIM) to be analysed is 400-1000 m/z. Within the mass range of interest, a plurality of MS1 scans are performed using mass sub ranges of the precursor ions of the mass range of interest. Alternatively, a single MS1 scan may be performed using precursor ions from the entire mass range of interest (i.e., 400-1000 amu in this example).

In order to perform a single MS1 scan, sample molecules from an LC column 750 are ionized using the ESI source 20. Sample ions subsequently enter the vacuum chamber of the mass spectrometer 10. The sample ions are directed through capillary 25, RF-only lens 30, injection flatapole 40, bent flatapole 50 and into the quadrupole mass filter 70 in the manner as described above. The quadrupole mass filter 70 is controlled by the controller 195 to filter the sample ions according to the selected precursor mass sub-range of interest. For example, as shown in FIG. 4 MS1 scans are performed across a mass range of interest from 400 m/z to 1000 m/z in precursor mass sub-ranges of 400-500 m/z, 500-600 m/z . . . to 900-1000 m/z. Ions then pass through the quadrupole exit lens/split lens arrangement 80, through the transfer multipole 90 and into the C-trap 100 where they are accumulated. From the C-trap 100, (precursor) sample ions of the mass range segment may be injected into the orbital trapping mass analyser 110. Once ions are stabilised inside the orbital trapping mass analyser, the MS1 scan is performed by using the image current detector to detect the ions present in the orbital trapping mass analyser 110. The detection of the ions in the orbital trapping mass analyser is configured to be performed with a relatively high resolution for the MS1 scan (relative to the resolution of the MS2 scans).

By using a Fourier Transform mass analyser (for example, an orbital trapping mass analyser), the MS1 scans are performed with a high degree of mass accuracy. Preferably, the MS1 scans are performed with a mass accuracy of less than 5, or more preferably 3 parts per million (ppm).

In tandem with the MS1 scans, a plurality of MS2 scans are performed, as shown in FIG. 4. In the method of FIG. 4, the MS2 scans are performed using the time-of-flight mass analyser, MR-ToF. In other embodiments, a different mass analyser may be used.

In order to perform a single MS2 scan of a mass range segment, sample molecules from the LC column 750 are ionized and injected into the mass spectrometer in a similar manner to the MS1 scan. The sample ions for the MS2 scan progress through the capillary 25, RF-only lens 30, injection flatapole 40, bent flatapole 50 and into the quadrupole mass filter 70 in a similar manner to the sample ions for the MS1 scan. Once the sample ions for the MS2 scan reach the quadrupole mass filter 70, the quadrupole mass filter 70 is controlled by the controller 195 to filter the sample ions according to the relatively narrow mass range segment being scanned. Each precursor mass range segment may have a mass range of, for example, no greater than 5 amu, or preferably no greater than 3 amu, or more preferably no greater than 2 amu (as shown in FIG. 4). The (filtered mass range segment) precursor ions pass from the quadrupole mass filter 70 through to the C-trap 100 as described above for the MS1 scan. The controller 195 then controls the C-trap to allow the precursor ions to pass through in an axial direction towards the fragmentation chamber 120. In the HCD fragmentation chamber 120, the precursor ions collide with collision gas molecules which results in the fragmentation of the precursor ions into fragment ions. The fragmented ions for the mass range segment are then ejected from the fragmentation chamber at the opposing axial end to the C-trap 100. The ejected fragmented ions pass into a second transfer multipole 130. The second transfer multipole 130 guides the fragmented ions from the fragmentation chamber 120 into an extraction trap (second ion trap) 140 where they are accumulated. The fragmented ions may be accumulated in the extraction trap 140 for a predetermined time. Fragmented ions are then injected from the extraction trap into the MR-ToF. The prior accumulation of fragmented ions in the extraction trap allows the fragmented ions to be injected as a packet into the MR-ToF. The packet of ions travels along the flight path of the MR-ToF undergoing multiple reflections before being detected at the detector. The varying arrival times of the fragmented ions within the packet allows a MS2 mass spectrum for the packet of fragmented ions to be generated. The length of the flight path of the MR-ToF in combination with the time resolution of the detector allows the MR-ToF to perform MS2 scans at a resolution in excess of 40,000 (see R=50,000 in FIG. 4).

One benefit of the packet-based approach to the analysis is that once the accumulated ions are ejected from the extraction trap, the ions for the next mass range segment can begin to fill the extraction trap. As such, ions from one mass range segment can be travelling through the MR-ToF while the ions for the next mass range segment are being accumulated. Thus, a greater number of ion counts can be achieved within a chromatographic peak due to the use of the accumulated packet-based injection of fragmented ions into the MR-ToF from the extraction trap. This is true whether MS1 or MS2 scans are being acquired and can be used when switching from MS1 to MS2 scans or vice versa.

The controller 195 controls the mass spectrometer 10 to perform a plurality of MS1 scans of the mass sub-ranges for the mass range of interest, and in tandem the plurality of MS2 scans of the mass range segments over the mass range of interest. In order to acquire a more accurate sample of the chromatographic peak, the controller 195 may repeat the scan cycle a number of times over the duration of the chromatographic peak. For example, a single cycle may take around 1.5 s to perform. As such, the cycle may be performed, for example, at least 7 times, or more preferably at least 9 times over the duration of a chromatographic peak. This enables the MS1 and/or MS2 spectral data to be used for quantitation of the eluting sample in the chromatographic peak. In some modes of operation, a single operation of the cycle may be sufficient.

FIG. 4 shows MS1 and MS2 collection for a single polarity. The foot of the figure shows how the ions from the source are distributed to the two analysers for MS1 and MS2 acquisition. It can be seen that for more of the time the ions from the ion source are directed to the MR-ToF for MS2 acquisition.

When it is desired to collect MS1 and/or MS2 scans over both polarities, as discussed, HRAM analysers have a lengthy polarity switching time which results in a deadtime in which the analyser(s) are not able to perform reliable scans. This is caused by the time it takes for the voltage supplies for the mass analysers to stabilize after polarity switching. Although there is also some deadtime during which the ion source and ion guide region are switching polarity this is much less than the deadtime for the analysers.

Both the orbital trapping analyzer and MR-ToF analyzer are capable of recording accurate mass spectra either as full MS or MS/MS fragmentation spectra. The orbital trapping mass analyser is relatively slow to acquire very high-resolution spectra, requiring 512 ms to record 240K resolution peaks, but may operate more rapidly, up to nearly 50 Hz, for lower (but still HRAM) performance. The orbital trapping analyser may polarity switch within experimental timescales, taking 400 ms. The MR-ToF on the other hand cannot polarity switch within LC-MS timescales, as the high voltage electronics required to achieve this become excessively expensive and expansive. It may operate with a very high repetition rate, 200 spectra per second, with high sensitivity and 50-100K resolving power. Due to ion statistical limitations, multiple voltage dependencies, and space charge effects, the MR-ToF mass accuracy may possibly be slightly inferior to that of the orbital trapping analyser. This balance of properties indicates that the orbital trapping analyser may be better suited for acquiring the infrequent full-MS (MS1) spectra, whilst the MR-ToF performs better for MS/MS (MS2) spectra where repetition rate and sensitivity are in high demand. In a preferred arrangement the acquisition of the full-MS scan may be parallelized with MR-ToF operation, so that both analysers may be kept occupied simultaneously for at least a portion of the measurement cycle.

Method

Figure 5:
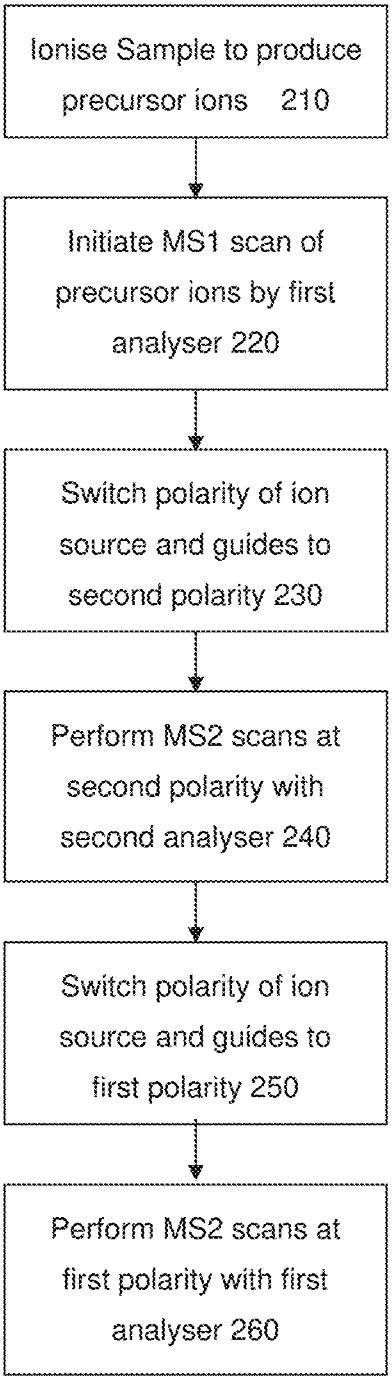
FIG. 5 is a flow-chart showing a method of performing dual polarity tandem mass spectrometry to obtain MS2 scans in positive and negative polarities.

The present invention is directed to a method of mass spectrometry for analysing a sample, such as a nucleic acid-protein complex. The method includes fragmentation of sample ions and analysis of the fragments in both polarities, while maximising analyser operational time. In this method, the mass spectrometer may be the mass spectrometer of FIG. 2 or FIG. 3 or may be another suitable mass spectrometer comprising two or more mass analysers. Following any appropriate separation, digestion and/or cross-linking of the nucleic acid-protein complex or similar analyte, the method comprises inputting the sample into the mass spectrometer. The sample may be input into the mass spectrometer by a liquid chromatography (LC) column 750. FIG. 5 shows steps of the method performed on the sample in the mass spectrometer. Once input, the sample is ionized 210 to produce a plurality of precursor ions. The precursor ions are directed to one of the analysers of the mass spectrometer for MS1 analysis. In the mass spectrometer of FIGS. 2 and 3 the MS1 analysis may be performed by the orbital trapping mass analyser. The ionization of the sample to form precursor ions may be performed with the ion source and ion guide region set to a first polarity such as positive mode. In positive mode, ionization may occur through protonation, that is the addition of one or more protons to the molecule or species. This adds a charge (and amu) of +1, per proton added, to the molecule or species and represents a mass shift to be taken into account in the mass spectrometry analysis. The collection or accumulation of ions for the MS1 scan may be performed in an ion trap such as C-trap 100 of FIG. 2 or 3, or the ions may be directed straight to the mass analyser and accumulate there. In the case of the arrangement of FIGS. 2 and 3 it is preferable to accumulate the ions in the fragmentation chamber 120, also known as an ion routing multipole collision cell (or IRM) and then pass the ions back to the C-trap. From the C-trap the ions are injected as a packet to the first mass analyser. After the ions are input to the first mass analyser, the MS1 scan may be initiated as shown at step 220. The MS1 scan will take longer than an MS2 scan. For example, an MS1 scan performed by the orbital trapping mass analyser to high resolution may take 512 ms to complete. During this time in normal operation the ion source would be unoccupied because of an effective deadtime of the first analyser.

The present invention makes use of this deadtime by performing MS2 scans using the second analyser. Furthermore, the MS2 scans are performed at the opposite polarity to the MS1 scan. Following completion of the MS1 scan the first analyser performs MS2 scans at the first polarity. By this method MS2 scans can be obtained in both polarities while minimizing deadtime.

Figure 6:
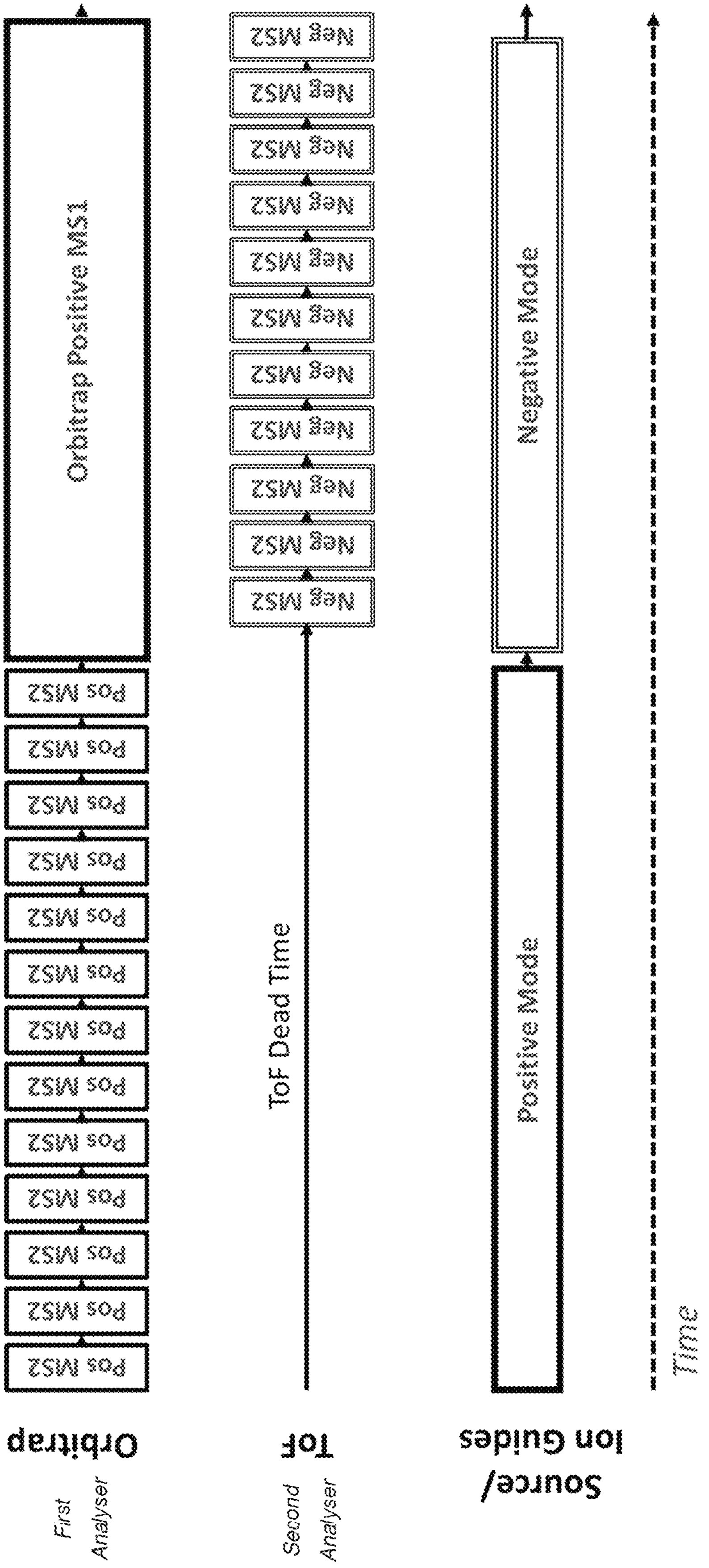
FIG. 6 shows a method of performing dual polarity tandem mass spectrometry with first and second analysers according to an embodiment of the present invention.

Returning to FIG. 5, following initiation of the MS1 scan at step 220, the ion source and ion guides are switched from first polarity such as positive mode to a second polarity such as negative mode. The switching of the source and ion guides is shown at step 230 in FIG. 5. We also now refer to FIG. 6 which shows the polarity of the ion source and guides as well as the polarity of the two analysers over time. In FIG. 6 positive polarity operation of the ion source/ion guides and first mass analyser is shown by thick black lines, whereas negative polarity operation of the ion source/ion guides and second mass analyser is shown by thin double grey lines. Based on the analyser of FIGS. 2 and 3 the second analyser mentioned in FIG. 6 is a time-of-flight analyser (ToF). The switching polarity of the ion source and ion guides is shown roughly half way along the time axis for the ion source and ion guides. As mentioned above, the first analyser is occupied performing an MS1 scan. During this time ions are collected in packets and directed to the second analyser to perform MS2 scans. Since the time period for performing an MS2 scan is much shorter than the time period for an MS1 scan multiple MS2 scans can be performed. After completion of the MS1 scan by the first analyser the ions source and ion guides are switched back to the first polarity. This is shown at step 250 in FIG. 5. At this time the second analyser will be performing an MS2 scan and the switching is preferably timed such that the collection of ions for the final MS2 scan has been completed and the MS2 scan can continue and be completed, for example, while the ion source and guides are switching polarity. Once the ion source and ion guides have switched back to the first polarity the first analyser may perform a plurality of MS2 scans at the first polarity, as shown at step 260 in FIG. 5. After sufficient MS2 scans have been performed by the first analyser, the process or cycle may now repeat and, ions may again be collected and the first analyser may commence an MS1 scan. As shown in FIG. 6, the switching time of the ion source and guides is relatively small and may be less than 100 ms, for example 50 ms. Accordingly, analysis is being performed of the sample eluting from the LC column almost continuously and alternately in positive and negative modes. As shown in FIG. 6, the process including an MS1 analysis and dual MS2 analysis may repeat.

As can be seen by the process shown in FIGS. 5 and 6 the first and second mass analysers are not polarity switched and are each maintained at a constant polarity, with the first and second analysers at opposite polarities. By not switching polarity of the two analysers long switching times, such as 400 ms or more, are avoided and long periods when one polarity mode is not in use are prevented. This means that MS2 scans in one or other polarity are being collected almost continuously avoiding loss of sample information.

We discussed above switching polarity of the ion source and ion guides or processing region. To explain further, if we consider the instruments of FIGS. 1-3, we can separate the instrument into sections and configure the polarities for each section independently, for example, for the ion source, ion guides or processing region, first mass analyser and second mass analyser. For the mass spectrometer of FIG. 2 the ion source corresponds to the ESI source 20, and the ion processing region corresponds to the capillary 25, RF-only lens 30, injection flatapole 40, bent flatapole 50, ion gate 60, quadrupole mass filter 70, exit lens/split lens arrangement 80, transfer multipole 90 and C-trap 100. The polarity of the components in the ion processing region and ion source are preferably switched together. Depending on the scan being performed the fragmentation chamber 120, second transfer multipole 130 and the extraction trap 140 may also be switched polarity with the ion processing region. Further division or subdivision of the switching of the ion source and processing region is possible, depending on the implementation and scan being performed. In the embodiment of FIG. 2, the first mass analyser is the orbital trapping analyser 110 and switching polarity of the orbital trapping analyser 110 may comprise switching the orbital trapping analyser and injection optics (shown between reference numbers 100 and 110 in FIG. 2). Also, in the embodiment of FIG. 2, the second analyser is the MR-ToF analyser 150 and switching polarity of the MR-ToF analyser may comprise switching polarity of items 160-180 and may additionally comprise switching the second transfer multipole 130 and extraction trap (second ion trap) 140. Many of the components in the ion source and ion guide/processing region switch relatively quickly, although the C-trap 100 to orbital trapping analyser extraction DC voltages may be slower but are only required for an orbital trapping analyser scan.

The method of obtaining MS2 scans in both polarities is used for obtaining information, including identifying interaction sites, in nucleic acid-protein complexes. In this embodiment the sample is introduced into the mass spectrometer by the LC column 750. A full mass (MS1 scan) is performed by the first analyser, which may be an orbital trapping analyser operating with high resolution in positive ion mode. Based on the results of the MS1 scan (or otherwise), precursor ions of interest are isolated and fragmented for MS2 analysis. Positive ion mode analysis occurs in the first analyser, for example the orbital trapping analyser, and analyses the peptide moieties or species. Negative ion detection mode occurs in the second analyser, for example the time-of flight analyser for oligonucleotide moieties or species. The second analyser may alternatively be an ion trap or second orbital trapping analyser.

For the above-described analysis method the hybrid mass spectrometer is required to have two or more analysers and the ions source and ion guides are required to have fast, such as less than 100 ms, polarity switching. By employing dual polarity MS2 analysis the method eliminates longer and more cumbersome techniques, for example, the need to use different chromatographic or ion source set ups for each polarity analysis or multiple runs. The method enables complete fragmentation of analytes of both polarities in a single run.

The settings for the MR-ToF analyzer may be fixed, with the quality of spectra varying only with level of averaging and optionally time for ion accumulation. Orbital trapping analyser acquisition times determine both resolving power and maximum ion accumulation time but lengthening these compromises the number of spectra that may be acquired. This trade-off usually needs to be optimized for each method. However, for a one hour experiment a 64 ms MS2 scan with 30K resolution is suitable for DDA measurements. In general, higher spectral quality is needed over simply acquiring many spectra, due to the need for high sequence coverage for each peptide to identify modification/interaction sites.

As mentioned, each analyser operates at its own fixed polarity, removing the need for analyser polarity switching which for HRAM analysers is slow. For the orbital trapping analyser, if polarity switching of the analyser was required this would take around 400 ms out of the experimental cycle, greatly reducing time for spectral acquisition. Furthermore, very few ToF analysers can polarity switch within LC-compatible timescales at all. The second analyser acquires it's MS2 spectra while the orbital trapping analyser is occupied generating the MS1 scan. In an alternative embodiment the roles or polarities of the orbital trapping analyser and ToF may be reversed such that the ToF analyser performs the MS1 acquisition.

The positive MS1 scan will show the precursors which are targeted for negative MS2 acquisition and positive MS2 acquisition. Hence, there is no need to perform MS1 scans for both polarities. Optionally, the MS1 scans in the negative polarity may be performed to maximise quality of data. However, this will result in a commensurate reduction in time for MS2 spectra.

In alternative methods, the MS1 (full MS) scan may be performed in the ToF analyzer, or the analysers assigned to positive or negative polarity maybe switched. In addition, in embodiments an MS1 (full MS) scan of each polarity may be performed by each analyser.

In considering the MS1 data for the precursor ions, a small but predictable mass shift will need to be taken into account due to the ionization by protonation or deprotonation. For example, for the nucleic acid-protein complex the peptide sequence will be protonated and the oligonucleotide sequence will be deprotonated.

Figure 7:
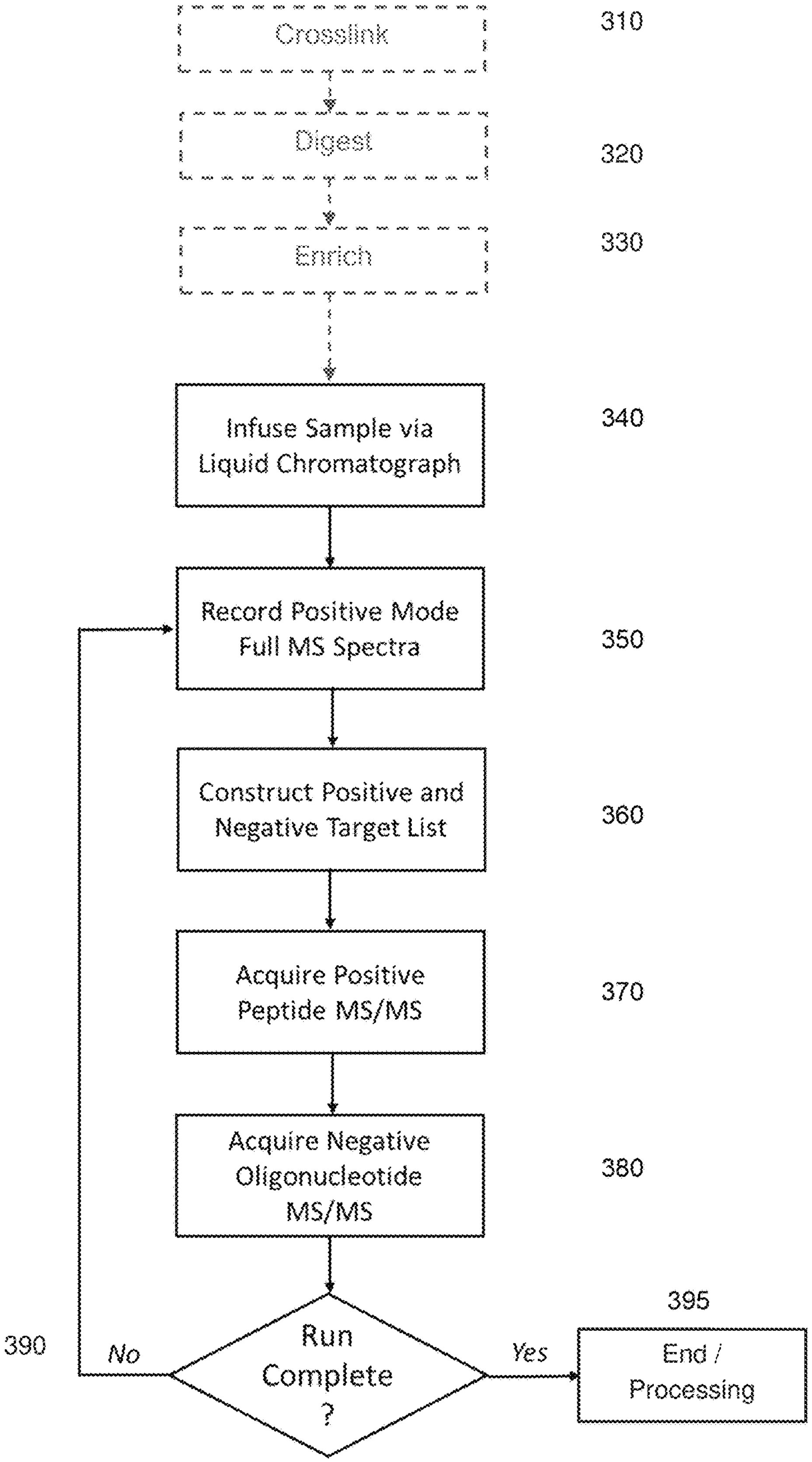
FIG. 7 is a flow-chart showing a method of acquiring MS2 scans of peptides and oligonucleotides from a nucleic acid-protein complex.

FIG. 7 is a flow chart of a process for identifying interaction sites in nucleic acid-protein complexes. Nucleic acid-protein complexes play pivotal roles in many central biological processes. Hence, it is important to understand the specific nucleic acid bound by a particular protein. This method provides a systematic way to identify the interaction sites on proteins.

The nucleic acid-protein complex sample to be investigated at step 310 is crosslinked to stabilize the complex. Crosslinking may be performed by UV irradiation such as at 254 nm. Alternatively, chemical crosslinkers may be used for crosslinking. The sample is then digested at step 320 such as using a nuclease. In the present method only a single type of nuclease is used but multiple types of nuclease may be used. The method uses a single nuclease to generate longer fragments of nucleic-acid. Prior methods use a mix of multiple different types of nuclease to produce short chain oligonucleotide fragments, with each having a maximum of 4-5 nucleotides. The use of multiple types of nuclease is due to the limitations of prior mass spectrometry techniques. The mass spectrometry method of the present invention allows longer chain oligonucleotide fragments to be studied and hence only a single nuclease is required. At step 330 the sample may be enriched for cross linked peptides. There are many methods of enrichment. One such method is enrichment by TiO2. Enrichment improves the detection of low-abundancy proteins.

At step 340 the crosslinked, digested and enriched sample is introduced into the liquid chromatography (LC) column 750 of the mass spectrometer system. The LC column separates the sample by different species having different rates of propagation through the column. On elution from the LC column the species are input to the mass spectrometer for ionization and analysis. A method such as that shown in FIG. 6 is then performed, beginning with the mass spectrometer performing a positive mode MS1 (full MS) scan, as shown at step 350. This may be performed by an orbital trapping analyser of a dual analyser mass spectrometer such as those shown in FIGS. 2 and 3. Data dependent analysis (DDA) is performed. The positive mode MS1 (full MS) scan is used to identify precursor ions that may undergo MS2 or MS/MS analysis. That is, the precursor ions may be fragmented in the mass spectrometer and the fragments further analysed in the mass analyser. A single positive mode MS1 (full MS) scan may be sufficient to identify precursors for both positive and negative MS2 analysis. From the MS1 analysis of precursor ions a target list of positive and negative ions may be constructed, as shown at step 360 in FIG. 7. Positive and negative MS2 analysis is then performed as shown at steps 370 and 380 using the DDA method of targeted analysis instead of a DIA method where a full range of possible precursor ion masses are scanned and fragmented. Positive MS2 analysis identifies peptides and negative MS2 analysis identifies oligonucleotides. The MS2 analysis may be performed based on the scheme of FIG. 6 in which following acquisition of ions for the positive mode MS1 scan by the first analyser which may be an orbital trapping analyser, the ion source and guides are switched polarity and negative MS2 scans are obtained using the second analyser, which may be a time-of-flight analyser. The MS2 scans take less time than the MS1 scans and so a plurality of MS2 scans can be obtained while the MS1 scan is being obtained by the orbital trapping analyser. As the orbital trapping analyser approaches completion of the MS1 scan the polarity of the source and ion guides are switched back to positive mode and positive MS2 scans are obtained using the first analyser. The cycle shown in FIG. 6 may then repeat for as long as the sample elutes from the LC column.

Initially, based on the cycle shown in FIG. 6, the MS2 scans may be performed before the results from the MS1 scan have been received and processed. For these MS2 scans a prediction of likely ions to be fragmented may be used to determine the mass ranges to scan. Later, once the target list of positive and negative fragmented ions has been constructed, the mass ranges for the MS2 scans can be adjusted to better align with the masses of the targets. The series of scans shown in FIG. 6 repeat cyclically. Hence, alternatively to using predictions, the mass spectrometer may wait until MS1 data has been collected and mass ranges of interest for MS2 have been identified before performing an MS2 scan. Once the MS2 scans are running and correctly targeted to desired mass ranges the MS1 scans may no longer continue, for example, in a given chromatographic elution peak. However, the sample will likely generate multiple peaks spread across different times as different species or moieties elute from the LC column. Hence, continued collection of MS1 scans, as shown at 390 in FIG. 7, allows the timing of different species or entities to be determined and the mass ranges of interest for the MS2 scans to be changed to correspond with the different species or entities.

In using the positive MS1 scan to determine mass ranges for positive and negative ions to be fragmented for the MS2 scans, account should be taken that the positive measured ions from the MS1 scan will be protonated, whereas the negative ions will be deprotonated. Hence, the mass range of interest of the MS2 scans for the negative ions should be adjusted accordingly.

Returning to FIG. 7, once the sample has finished eluting and all mass scans have been taken the run of scans is completed, as shown at step 395. Processing of the scan data to determine interaction sites of the nucleic acid-protein complex may commence. A typical experimental length from start to finish for the mass spectrometer steps (that is, steps 340-390 shown in FIG. 7) is 1-2 hours, but will be controlled by the solvent gradient of the LC.

The output of the MS1 and MS2 spectra may be processed via analysis software. One type of analysis software is NuXL node based developed for Proteome Discoverer™. Other analysis software is also available. The analysis software is used to identify the peptides, pre-digested proteins, cross-linked oligonucleotides and their linking positions in the originating sample. One embodiment of such a data analysis tool identifies cross-linked species at the MS1 and MS2 level. This leads to identification and detailed annotation of cross-linked species in the spectra including fragment ions. The identification and annotation of mass shifts in MS2 spectra is the basis for automated localization of the crosslinking site within a peptide. The software first identifies a peptide or a sequence tag of the peptide and then searches for specific RNA or DNA mass adducts included in the search library as a mass difference between peptide and adduct. These adducts/fragments are different for different type of crosslinker, such as UV or chemical and RNA vs DNA. Additional information on prior art techniques for identifying protein-RNA cross-linked species can be found in Veit, J. et al. LFQProfiler and RNPxl: open-source tools for label-free quantification and protein-RNA cross-linking integrated into proteome discoverer. J. Proteome Res. 15, 3441-3448 (2016). Other analysis methods and tools may alternatively be used.

The embodiments described herein, which relate to dual polarity analysis, have been described in relation to analysis of nucleic acid-protein complexes for identification of interaction sites. The dual polarity techniques may also be used to analyse lipids. Some lipids are ionized well in the positive mode whereas some are ionised in the negative mode. Fatty acids will tend to require negative mode ionization but the polar head can be analysed in the positive mode. Another type of molecule the methods may be applied to are glycopeptides such as containing complex glycans with multiple sialic acids. In this case the peptide part will be analysed in the positive mode and the glyco part in the negative mode.

After producing MS1 and MS2 scans of the sample such as a lipid or glycopeptide, analysis of the results may be by a software tool, such as those described above but modified for the particular analyte being studied so as to take into account that they will fragment differently.

Figure 8:
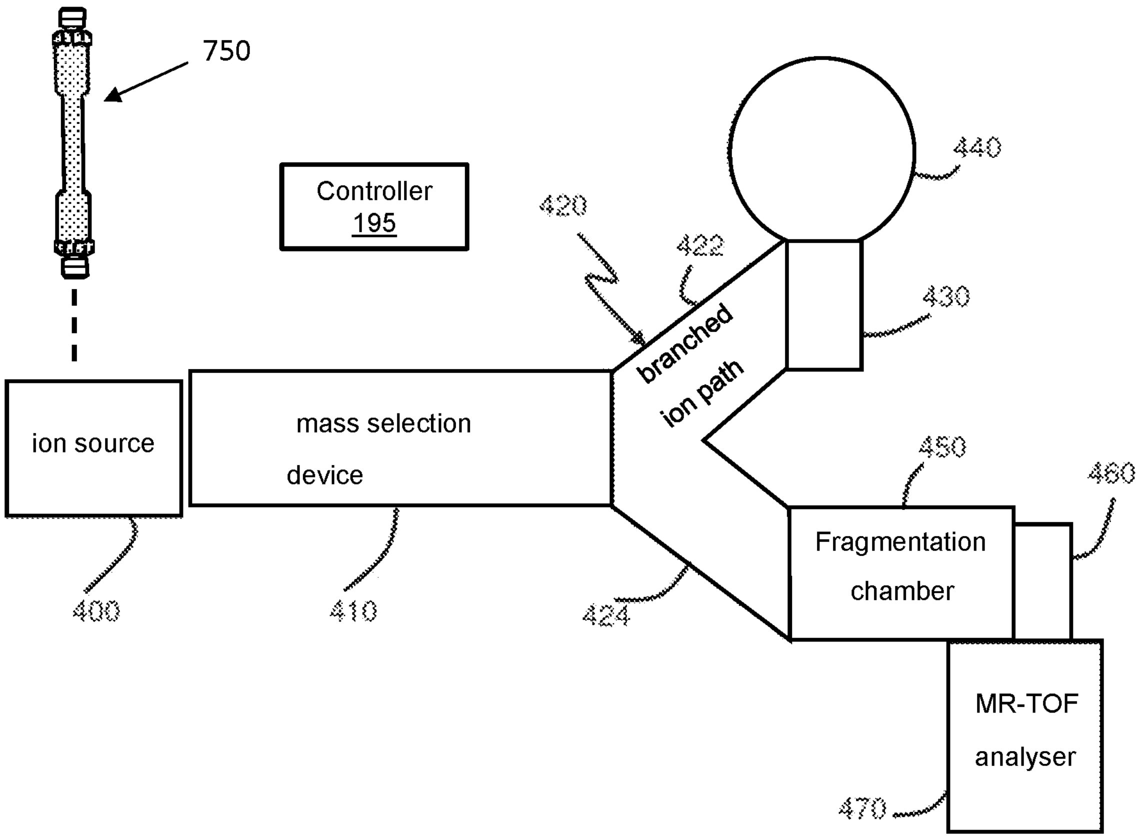
FIG. 8 shows a schematic diagram of an alternative mass spectrometer suitable for carrying out methods in accordance with embodiments of the invention.

We have described above, with reference to FIGS. 2 and 3, an embodiment of dual analyser mass spectrometer. In an alternative embodiment, the mass spectrometer may be provided with a branched path arrangement, for example as shown in the embodiment in FIG. 8. In the embodiment of FIG. 8, an ion source 400 is coupled to an ion processing region such as mass selection device 410. Such an arrangement may be provided by the ESI ion source 20 and its respective couplings to the quadrupole mass filter 70 as shown in the embodiment of FIG. 2 for example.

As shown in FIG. 8, the output of the mass selection device 410 is coupled to the branched ion path 420. The branched ion path directs ions output from the mass selection device along one of two paths. A first path 422 directs ions to a C-trap 430 where ions are collected for analysis by a first mass analyser, for example an orbital trapping mass analyser 440 in the MS1 domain. A second path 424 directs ions to a fragmentation chamber 450 for fragmentation of ions and subsequent mass analysis in the MS2 domain by a second mass analyser 470. The branched ion path may use an RF voltage to direct ions down either the first path 422 or the second path 424. The branched ion path may be a branched RF multipole. A branched ion path suitable for use in the embodiment of FIG. 8 is further described in U.S. Pat. No. 7,420,161.

In the embodiment of FIG. 8, the branched ion path may be used to direct ions to a C-trap 430 for MS1 analysis or to a fragmentation chamber 450 for MS2 analysis. Fragmented ions ejected from the fragmentation chamber 450 may be accumulated in ion extraction trap 460, before being injected into MR-ToF analyser 470 as a packet. As such, the arrangement of the fragmentation chamber 450, ion trap 460 and MR-ToF 470 may be provided by a similar arrangement as described in FIG. 2.

Thus, according to the embodiment of FIG. 8, ions may be directed for MS2 analysis without requiring the C-trap 430 supplying the MS1 orbital trapping mass analyser 440 to be empty. Such a configuration may allow increased parallelisation of the MS1 and MS2 scans. As such, a greater proportion of the duration of a chromatographic peak may be available for carrying out MS2 scans. Furthermore, in this configuration, a number of loadings or fills can be accumulated in the C-trap 430 before analysis in the orbital trapping mass analyser 440. In such embodiments, the loading (filling) of the C-trap 430 can be split into several small fills whilst the orbital trap mass analyser 440 is scanning, thereby to obtain a population of ions that is more representative of the ions from across the entire peak. Again, shuttling of fragmented ions back from the fragmentation chamber to the first analyser may be used for the first analyser to perform MS2 scans.

Figure 9:
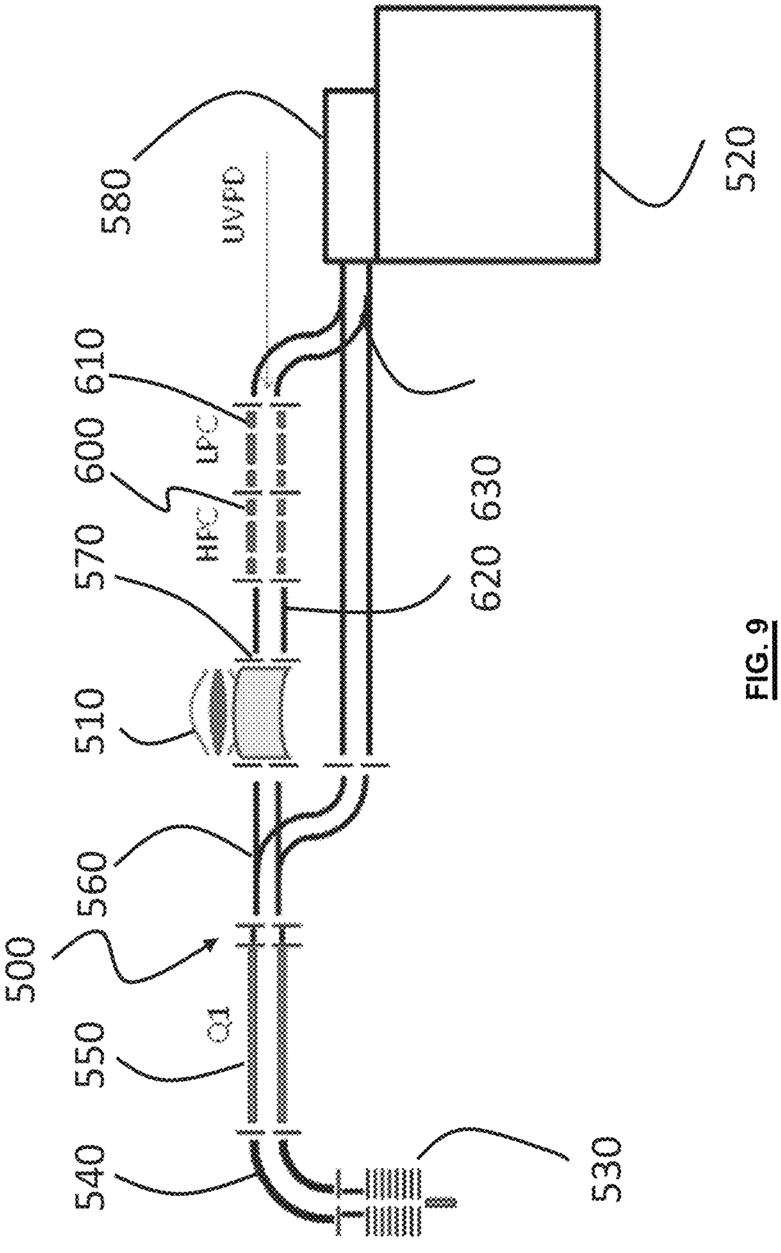
FIG. 9 shows a schematic diagram of a further alternative mass spectrometer suitable for carrying out methods in accordance with embodiments of the invention

A further alternative embodiment of an embodiment of a dual analyser mass spectrometer is shown in FIG. 9. FIG. 9 depicts a schematic diagram of a tandem mass spectrometer 500 including an orbital trapping mass analyser 510 and a time-of-flight mass analyser 520 in a branched path configuration.

The embodiment of FIG. 9 includes an ion source 530 and ion guide 540 which supply precursor ions to a mass selector 550. Such an arrangement may be provided by the ESI ion source 20 and its respective couplings to the quadrupole mass filter 70 as shown in the embodiment of FIG. 2 for example.

As shown in FIG. 9, a branched ion path 560 guides ions from the mass selector 550 to a C-trap 570 and/or an extraction trap 580. The C-trap 570 supplies ions to the orbital trapping mass analyser 510 for MS1 scans, while the extraction trap 580 supplies ions to the time-of-flight mass analyser 520. For example, a similar arrangement to the embodiment disclosed in FIG. 8 may be provided.

FIG. 9 additionally includes a dual linear trap 600, 610. The dual linear trap is connected downstream of the C-trap 570 between the C-trap 570 and the extraction trap 580 for the time-of-flight mass analyser. The dual linear trap may be connected to the C-trap 570 and the extraction trap 580 by ion guides 620, 630. Ion guide 630 may be a branched ion path which merges with the ion path from the mass selector 550 in order to connect to the extraction trap 580.

The dual linear trap 600, 610 may be provided for fragmentation and/or mass isolation of the ions. For example, a first ion trap 600 may be provided as a high energy collision dissociation chamber. A second ion trap 610, downstream of the first ion trap may be provided as a low collision dissociation chamber. By including a second dissociation chamber, fragmented ions may readily be fragmented again in the second chamber in order to perform MS3 analysis. Ions may be repeatedly isolated and fragmented for $MS^n$ analysis. The dual linear trap may also allow for fragmentation by collision induced dissociation (CID), electron capture dissociation (ECD), electron transfer dissociation (ETD), ultraviolent photo dissociation (UVPD), and so forth. Further details of a suitable dual ion trap may be found in U.S. Pat. No. 8,198,580, the contents of which is herein incorporated by reference in its entirety. Shuttling of fragmented ions from one of the fragmentation chambers to the first analyser may be used for the first analyser to perform MS2 scans.

Advantageously, by providing a branched path directly to the extraction trap 580 from the mass selector 550, ions may be more efficiently transferred from the mass selector 550 to the extraction trap.

The person skilled in the art will readily appreciate that various modifications and alterations may be made to the above-described methods and apparatus. The mass spectrometers described herein include an orbital trapping analyser and an MR-ToF analyser. In an alternative embodiment, the mass spectrometer may instead incorporate two Orbitraps, or two MR-ToF analyzers. Furthermore, the mass spectrometer may use regular ToF or FTICR analyzers, as alternative to the HRAM analysers. In other alternatives, the order of MS1 and MS2 scans and whether negative or positive polarity may be changed. Steps of methods from different embodiments may be combined. Alternative dual analyser mass spectrometers and alternative mass analysers may be used. The modifications may be made without departing from the scope of the appended claims. Any and all patents, patent publications and other non-patent literature mentioned herein are hereby incorporated herein by reference in their entirety except that, insofar as any such patent, patent publication or item of non-patent literature conflicts with the disclosure in this document, then the disclosure within this document shall control.

What is claimed is:

1. A data dependent acquisition (DDA) method of mass spectrometry using a dual analyser mass spectrometer for analysing a sample, the method comprising the steps of:

ionising the sample to produce a plurality of precursor ions;

performing, by a first mass analyser, an MS1 scan of the precursor ions in the sample and identifying precursor ions of interest;

selecting and fragmenting precursor ions of interest to produce first fragmented ions, and performing, by a second mass analyser, MS2 scans of the first fragmented ions;

selecting and fragmenting further precursor ions of interest to produce second fragmented ions, and performing, by the first mass analyser, MS2 scans of the second fragmented ions, wherein the second mass analyser operates in an opposite polarity to the first mass analyser so as to generate MS2 scans of fragmented ions having an opposite polarity to the fragmented ions of the MS2 scans generated by the first mass analyser.

2. The method of claim 1, wherein the second mass analyser performs the MS2 scans of the first fragmented ions at the same time as the first mass analyser is performing the MS1 scan of the precursor ions.

3. The method of claim 1, wherein ion source and ion guides of the dual analyser mass spectrometer are polarity switched between performing the MS2 scans of the first fragmented ions and the second fragmented ions.

4. The method of claim 1, wherein ion source and ion guides are polarity switched between injecting the precursor ions into the first mass analyser for the MS1 scan and injecting the first fragmented ions into the second mass analyser for the MS2 of the first fragmented ions.

5. The method of claim 1, comprising at the same time as the first mass analyser is performing the MS1 scan: injecting the first fragmented ions into the second mass analyser and successively performing MS2 scans by the second mass analyser.

6. The method of claim 1, wherein the first mass analyser operates in a first polarity mode for performing the MS1 scan of the precursor ions and the MS2 scans of the second fragmented ions, and the second mass analyser operates in a second polarity mode for performing the MS2 scans of the first fragmented ions.

7. The method of claim 1, wherein during a cycle comprising a first period for which source and ion guides are maintained at a first polarity and a second period for which the source and ion guides are maintained at a second polarity opposite to the first polarity, the mass spectrometer performs the MS1 scan, the MS2 scans of the first fragmented ions and the MS2 scans of the second fragmented ions.

8. The method of claim 7, wherein ion source and ion guides are polarity switched between performing a last MS2 scan of the first fragmented ions in a cycle and performing a first MS2 scan of the second fragmented ions.

9. The method of claim 7, further comprising repeating the cycle.

10. The method of claim 1, wherein the first mass analyser is operated in a positive polarity mode and the second mass analyser is operated in negative polarity mode.

11. The method of claim 1, wherein ion source and ion guides switch polarity from the first polarity to the second polarity in less than 50 ms, less than 100 ms, less than 200 ms or less than 500 ms.

12. The method of claim 1, wherein the dual analyser mass spectrometer comprises one or more ion traps such as curved linear ion traps or C-traps, the method comprising, at least one of the one or more ion traps, aggregating ions ionised by an ion source to form packets of ions, and, by the at least one ion trap, directing packets of ions to the first mass analyser and/or to the second mass analyser.

13. The method of claim 1, wherein the first and second mass analysers are high resolution accurate mass (HRAM) analysers.

14. The method of claim 1, wherein the first mass analyser is an orbital trapping mass analyser and the second mass analyser is a time-of-flight mass analyser.

15. The method of claim 1, the method being performed within a time period based on a width of a chromatographic peak of the sample as it elutes from a chromatography system.

16. A mass spectrometer, comprising:

an ion source and ion guides region, the ion source for producing a plurality of precursor ions from sample molecules and the ion guides region for guiding the precursor ions;

fragmentation apparatus for fragmenting precursor ions;

a first mass analyser; and a second mass analyser; and a controller comprising non-transient computer-readable instructions tangibly embodied thereon that are operable, when executed by the controller, to cause the mass spectrometer to perform the method of claim 1.

17. An analytical instrument comprising the mass spectrometer of claim 16 and a liquid chromatography column that is configured to separate molecules of a sample and provide the molecules to the mass spectrometer.

18. A non-transitory computer-readable medium having computer program instructions tangibly embodied thereon, said computer program instructions operable to, when executed on a computer or controller that is in communication with a mass spectrometer, cause the mass spectrometer to execute the steps of the method of claim 1.

19. A method of analysing protein-nucleic acid complexes, comprising:

cross-linking the protein-nucleic acid complex and digesting the complex to produce a sample comprising cross-linked peptides-oligonucleotides;

performing a data dependent acquisition method of mass spectrometry on the sample by introducing the sample into a LC mass spectrometer system, the data dependent method performed within a time period based on a width of a chromatographic peak of the sample as it elutes from the chromatography system of the LC mass spectrometer system, the data dependent method comprising the steps of any preceding claim; and analysing one or more of the MS2 scans to sequence and/or determine interaction sites in the protein-nucleic acid complex.

20. The method of claim 19, further comprising enriching the digested complex prior to performing the mass spectrometry steps.

21. The method of claim 19, wherein the step of digesting comprises digesting the cross-linked protein-nucleic acid complex using a single type of nuclease.

22. The method of claim 19, wherein the peptides are analysed by positive polarity MS2 scans and the oligonucleotides are analysed by negative MS2 scans.

23. The method of claim 19, wherein analysing the one or more MS2 scans to sequence and/or determine interaction sites in the protein-nucleic acid complex comprises:

identifying a peptide or a sequence tag of a peptide present in the sample based on data from one or MS2 scans;

searching a library for RNA or DNA mass adducts based on a mass difference between the peptide and adduct, wherein the adduct is related to the cross-linking; and based on the mass difference localizing a cross-linking site within the peptide.

* * * * *